(12) United States Patent
Takagi

(10) Patent No.: US 8,244,385 B2
(45) Date of Patent: Aug. 14, 2012

(54) CONTROL DEVICE INCLUDING ITERATIVE LEARNING CONTROL CIRCUIT

(75) Inventor: Kiyoshi Takagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 12/698,014

(22) Filed: Feb. 1, 2010

(65) Prior Publication Data

US 2010/0198371 A1     Aug. 5, 2010

(30) Foreign Application Priority Data

Feb. 3, 2009   (JP) ................................. 2009-022723

(51) Int. Cl.
    *G05B 13/02*    (2006.01)
(52) U.S. Cl. ........................................... 700/44; 700/60
(58) Field of Classification Search ..................... 700/44, 700/56, 60, 77
    See application file for complete search history.

(56) References Cited

U.S. PATENT DOCUMENTS

| 5,812,396 | A | | 9/1998 | Kato | |
|---|---|---|---|---|---|
| 5,900,707 | A | * | 5/1999 | Wakui | 318/625 |
| 6,727,977 | B2 | * | 4/2004 | Butler | 355/53 |
| 7,468,782 | B2 | | 12/2008 | Butler | |
| 2005/0231706 | A1 | * | 10/2005 | Yang et al. | 355/72 |
| 2010/0188647 | A1 | * | 7/2010 | Yang et al. | 355/72 |
| 2010/0222898 | A1 | * | 9/2010 | Yang | 700/29 |

FOREIGN PATENT DOCUMENTS

| JP | 8-241126 A | 9/2006 |
|---|---|---|
| JP | 2006-310849 A | 11/2006 |

OTHER PUBLICATIONS

Barton, K., Alleyne, A.G. "Cross-Coupled ILC for Improved Precision Motion Control: Design and Implementation". Proceedings of the 2007 American Control Conference (2007): 5496-5502.*
Barton, K., Alleyne, A.G. "A Cross-Coupled Iterative Learning Control Design for Precision Motion Control". IEEE Transactions on Control Systems Technology (2008) 1218-1231.*
Mishra, S., Yeh, W., Tomizuka, M. "Iterative Learning Control Design for Synchronization of Wafer and Reticle Stages". 2008 American Control Conference (2008) 3908-3913.*
Chunhong, W., Yin, W., Duan, G. "Cross-Coupling Control for Synchronized Scan of Experimental Wafer and Reticle Stage". International Technology and Innovation Conference (2006): 1168-1172.*

\* cited by examiner

*Primary Examiner* — Ryan Jarrett
(74) *Attorney, Agent, or Firm* — Canon U.S.A., Inc. IP Division

(57) ABSTRACT

A control device includes an iterative learning control circuit that includes first and second learning filters to which a synchronization error is input and is configured to feed forward a control input to a first control target based on an output of the first learning filter and to feed forward a control input to a second control target based on an output of the second learning filter. Each of the first and second learning filters includes transfer functions of the first and second control targets and transfer functions of controllers of the first and second control circuits.

17 Claims, 24 Drawing Sheets

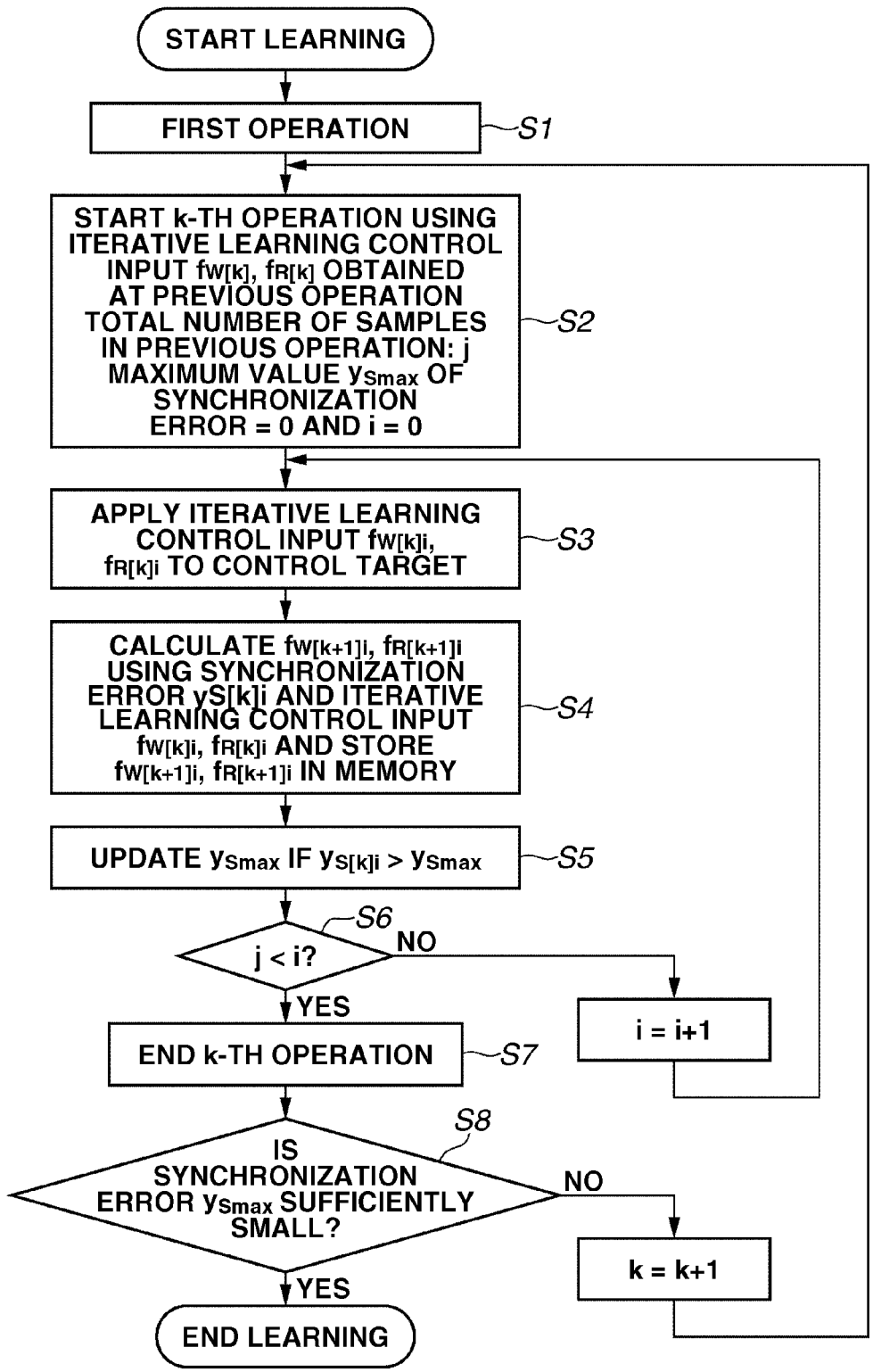

WITHOUT ITERATION

ITERATION NO.1

ITERATION NO.2

ITERATION NO.3

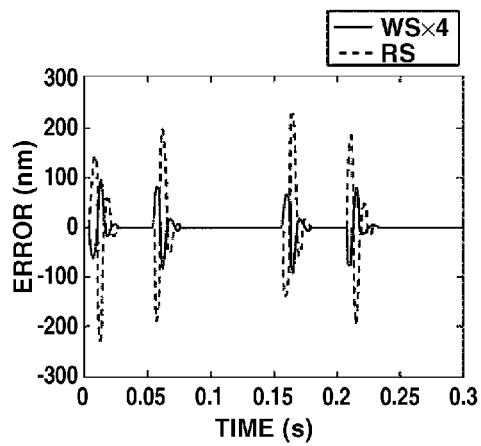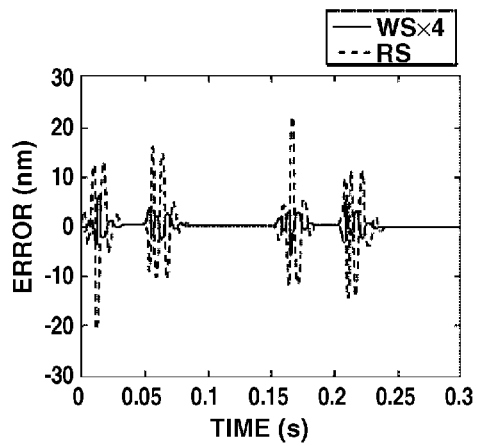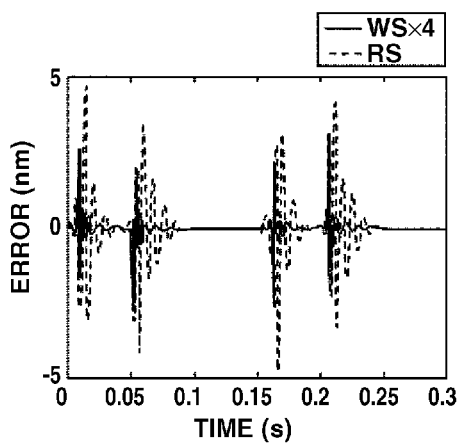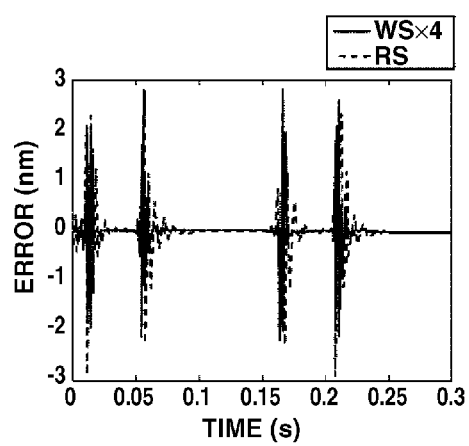

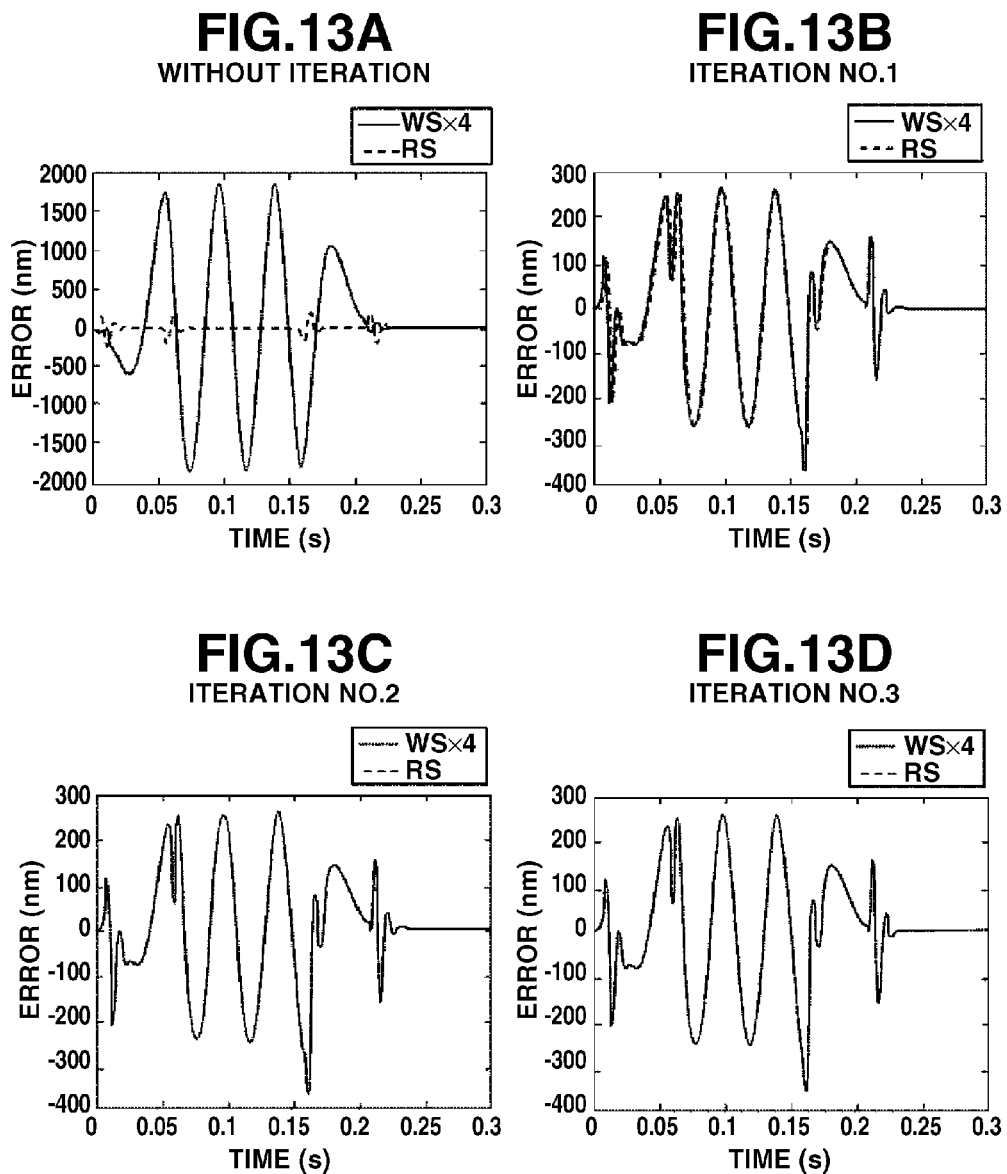

WITHOUT ITERATION

ITERATION NO.1

ITERATION NO.2

ITERATION NO.3

CONTROL DEVICE INCLUDING ITERATIVE LEARNING CONTROL CIRCUIT

BACKGROUND OF THE INVENTION

1. Field of the Invention

The present invention relates to a control device.

2. Description of the Related Art

In scanning exposure apparatuses or gantry-type machine tools, the positions of a plurality of moving members or the positions of a plurality of control axes with high accuracy are to be synchronously controlled. Therefore, conventionally, master-slave synchronization control has been performed. In the master-slave synchronization control, one of a plurality of moving members serves as a master, the other moving members serve as slaves, and the slaves follow the displacement of the master when a disturbance occurs in the master. In this way, the accuracy of synchronization is improved. The disturbance that occurs in the slaves is reduced by the control of the slaves.

In addition, bilateral synchronization control has been proposed to further improve the accuracy of synchronization between a wafer stage and a reticle stage (Japanese Patent Application Laid-Open No. 08-241126). In the bilateral synchronization control, the master and the slave are operated such that they both simultaneously compensate the synchronization error, without discriminating one from another, when disturbances occur in either one of control targets. In addition, Japanese Patent Application No. 2006-310849 discusses master-slave synchronization control to which iterative learning control is applied.

It is considered that the synchronization performance of the bilateral synchronization control (or similarly multi-lateral synchronization control for two or more control axes) may be better than that of the master-slave synchronization control. However, a control system of the former has a complicated structure, and it is difficult to derive or adjust the control system. As a result, it is difficult to improve the accuracy of synchronization.

SUMMARY OF THE INVENTION

According to an aspect of the present invention, a control device includes: a first control circuit configured to control a position of the first control target; a second control circuit configured to control a position of the second control target; a calculation unit configured to calculate a synchronization error between the first control target and the second control target; and an iterative learning control circuit including first and second learning filters to which the synchronization error is input, and configured to feed forward a control input to the first control target based on an output of the first learning filter and to feed forward a control input to the second control target based on an output of the second learning filter.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a flowchart illustrating the iterative learning control according to the first exemplary embodiment.

FIGS. 11A to 11D are diagrams illustrating a following error as the response of an independent iterative learning control simulation.

FIGS. 13A to 13D are diagrams illustrating a following error as a simulation response when a disturbance occurs in the first exemplary embodiment.

DESCRIPTION OF THE EMBODIMENTS

Hereinafter, a first exemplary embodiment will be described.

Figure 1:
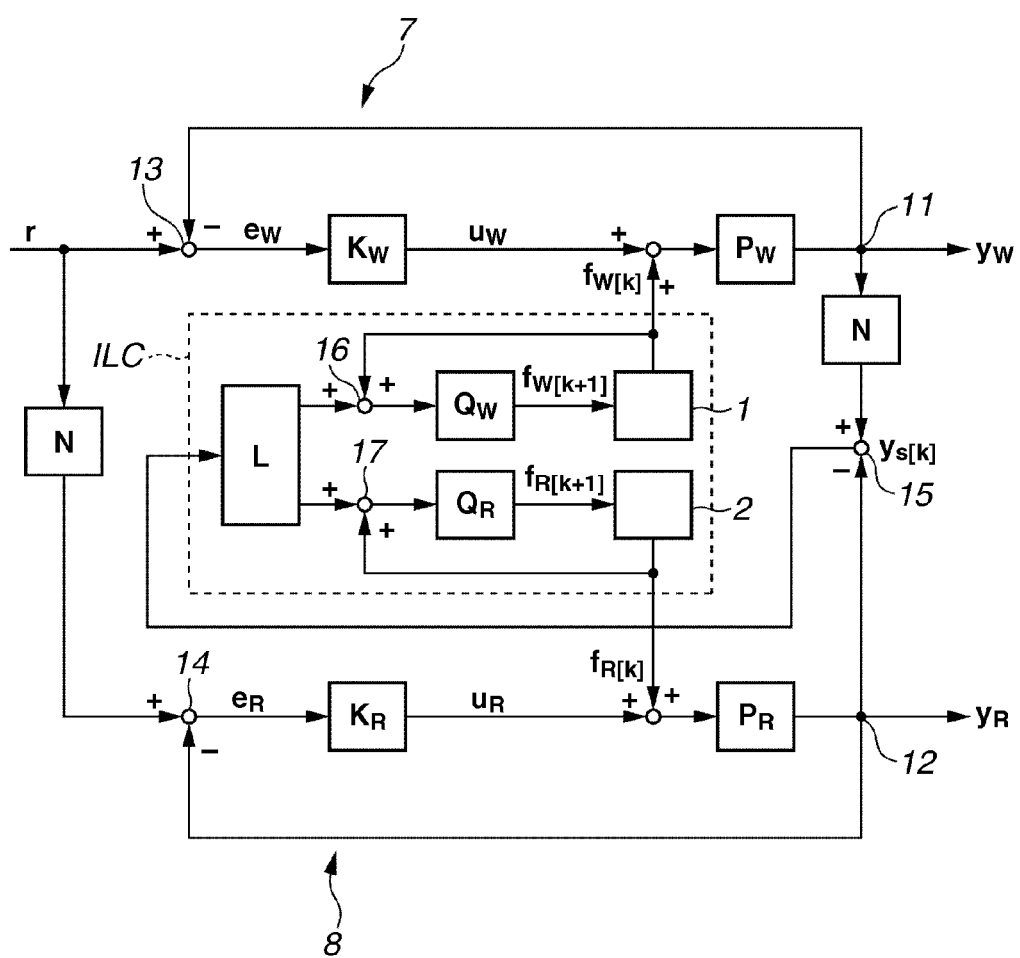
FIG. 1 is a block diagram illustrating iterative learning control according to a first exemplary embodiment.

FIG. 1 is a block diagram illustrating a control device that synchronously controls the positions of a wafer stage and a reticle stage in a semiconductor exposure apparatus. The control device includes a control circuit 7 (first control circuit) that controls the position of the wafer stage and a control circuit 8 (second control circuit) that controls the position of the reticle stage, and synchronizes the two control circuits.

Detection units 11 and 12 detect the positions $y_W$ and $y_R$ of the wafer stage (first control target) and the reticle stage (second control target), which are control targets. It is assumed that a transfer function of the wafer stage is $P_W$ and a transfer function of the reticle stage is $P_R$. Subtraction units 13 and 14 subtract the outputs of the detection units from target trajectories r and Nr (N is an exposure magnification) and the deviations $e_W$ and $e_R$ there between are input to feedback controllers (transfer functions are referred to as $K_W$ and $K_R$) A calculation unit 15 calculates a synchronization error $y_{S[k]}$, which is the difference between outputs $Ny_W$ and $y_R$, and the synchronization error is input to an iterative learning control circuit ILC. The output of the iterative learning control circuit ILC is added to outputs $u_W$ and $u_R$ which is control inputs of feedback controllers $K_W$ and $K_R$, and the added values are given to the control targets.

As such, in this exemplary embodiment of the invention, the synchronization error compensation is performed on both the wafer stage $P_W$ and the reticle stage $P_R$, thereby performing bilateral synchronization control. In addition, iterative learning control is performed for the synchronization error compensation. The iterative learning control repeatedly performs following control on a target trajectory to reduce the synchronization error. Next, the iterative learning control will be described with reference to the control block illustrated in FIG. 1 and a flowchart illustrated in FIG. 2. The iterative learning control circuit ILC includes a learning filter L where input signal is the synchronization error $y_{S[k]}$, stabilizing filters $Q_W$ and $Q_R$ that will not pass a frequency band unnecessary for learning, and memories 1 and 2 that store the outputs from the stabilizing filters.

In Step S1, a first operation is performed. In this step, the wafer stage and the reticle stage are controlled without any input from the iterative learning control circuit. The synchronization error $y_{S[1]}$ is input to the learning filter L, and the output of the learning filter L is stored as $f_{W[2]}$ and $f_{R[2]}$ into the memories 1 and 2 (a first memory device and a second memory device) through the stabilizing filters $Q_W$ and $Q_R$ (a first stabilizing filter and a second stabilizing filter). In Step S2, a k-th (k>1) operation starts. In this case, since digital control is performed, control inputs to an i-th sample during the k-th operation are referred to as $f_{W[k]i}$ and $f_{R[k]i}$, and the synchronization error thereof is referred to as $y_{S[k]i}$. Here, it is assumed that the total number of samples in one operation is j. The initial conditions are as follows: the maximum value $y_{Smax}$ of the synchronization error is 0; and the number i of samples is 0. In Step S3, the control inputs $f_{W[k]i}$ and $f_{R[k]i}$ previously stored in the memories are fed forward and added to outputs $u_{Wi}$ and $u_{Ri}$. In this way, in the k-th operation, the control targets are controlled.

In the k-th operation, a (k+1)-th control input is generated in Step S4 and is then stored in the memories 1 and 2. More specifically, the synchronization error $y_{S[k]i}$ is input to the learning filter L, and the outputs of the learning filter are added to the control inputs $f_{W[k]i}$ and $f_{R[k]i}$ by adders 16 and 17. Then, the added values are stored as $f_{W[k+1]i}$ and $f_{R[k+1]i}$ in the memories 1 and 2 through the stabilizing filters $Q_W$ and $Q_R$. In Step S5, the synchronization error $y_{S[k]i}$ is compared with the maximum value $y_{Smax}$ of the synchronization error. If the synchronization error $y_{S[k]i}$ is more than the maximum value $Y_{Smax}$, the maximum value $y_{Smax}$ is updated. In Step S6, if j<i (YES in Step S6), the procedure proceeds to Step S7. If j>i (NO in Step S6), i=i+1 is established, and the procedure proceeds to Step S3. In Step S7, the k-th operation ends. In Step S8, the maximum value $y_{Smax}$ of the synchronization error is compared with a predetermined set value. If the maximum value $y_{Smax}$ is less than the set value (YES in Step S8), it is determined that the deviation is sufficiently small and learning ends. If the maximum value $y_{Smax}$ of the synchronization error is more than the set value (NO in Step S8), k=k+1 is established and the procedure proceeds to Step S2.

Figure 3A:
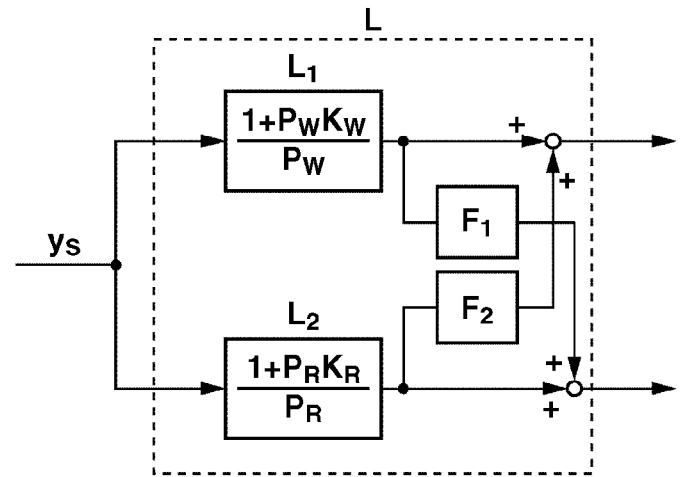
FIGS. 3A, 3B, and 3C are block diagrams illustrating the detailed structure of a learning filter illustrated in FIG. 1.

FIG. 3A is a block diagram illustrating the detailed structure of the learning filter L. The learning filter L includes a first learning filter $L_1$ and a second learning filter $L_2$ including transfer functions that are substantially equal to the following Expressions 1 and 2:

$$L_1 = \frac{1 + P_W K_W}{P_W}, \quad (1)$$

and $$L_2 = \frac{1 + P_R K_R}{P_R}. \quad (2)$$

In addition, the learning filter L includes a filter $F_1$ that adds the output of the first learning filter $L_1$ to the output of the second learning filter $L_2$ and a filter $F_2$ that adds the output of the second learning filter $L_2$ to the output of the first learning filter $L_1$. The synchronization error is input to the learning filters $L_1$ and $L_2$. The output of the learning filter $L_1$ passes through the filter $F_1$ and is added to the output of the learning filter $L_2$. Similarly, the output of the learning filter $L_2$ passes through the filter $F_2$ and is added to the output of the learning filter $L_1$. Hence, a portion of the output of one of the two learning filters is added to the output of the other learning filter. The output of the learning filter $L_1$ to which the output of the filter $F_2$ has been added is input to the adder 16, and the output of the learning filter $L_2$ to which the output of the filter $F_1$ has been added is input to the adder 17.

Figure 3B:
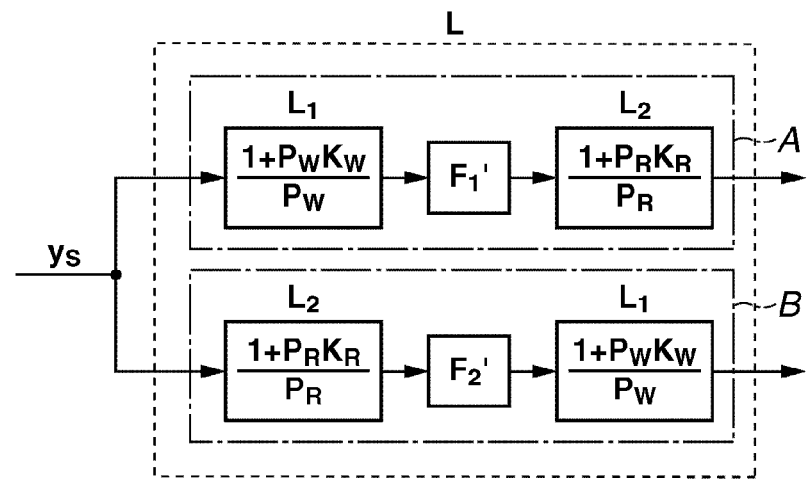

FIG. 3B shows a block diagram illustrating a modification of the learning filter illustrated in FIG. 3A. The learning filter L includes the first learning filters $L_1$ and the second learning filters $L_2$ including transfer functions that are substantially equal to Expressions 1 and 2. In addition, the learning filter L includes a filter $F_1'$ and a filter $F_2'$, and is classified into a control block group A including the learning filter $L_1$, the filter $F_1'$, and the learning filter $L_2$ connected in series to each other and a control block group B including the learning filter $L_2$, the filter $F_2'$, and the learning filter $L_1$ connected in series to each other. More specifically, the output of the learning filter $L_1$ is multiplied by the output of the learning filter $L_2$. The synchronization error is input to the two control block groups. The output of the control block group A is input to the adder 16, and the output of the control block group B is input to the adder 17.

Figure 3C:
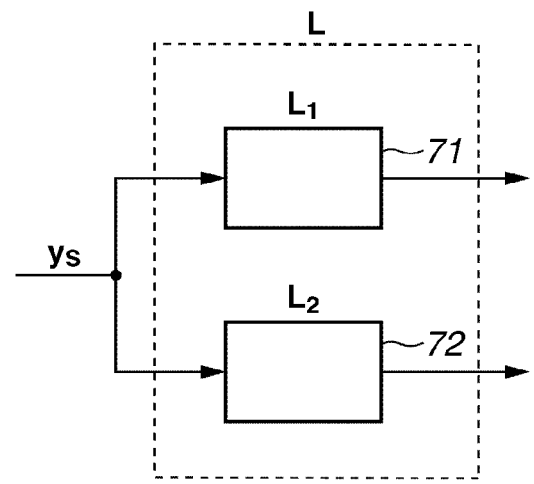

The learning filter may have the structure illustrated in FIG. 3C. The learning filter L includes a first learning filter 71 and a second learning filter 72. The learning filter 71 includes the transfer functions $P_W$ and $P_R$ of the wafer stage and the reticle stage and the transfer functions $K_W$ and $K_R$ of the feedback controllers. The learning filter 72 also includes the transfer functions $P_W$ and $P_R$ of the wafer stage and the reticle stage and the transfer functions $K_W$ and $K_R$ of the feedback controllers. The output of the learning filter 71 is input to the adder 16, and the output of the learning filter 72 is input to the adder 17. If L1+L2F2 illustrated in FIG. 3A is the learning filter 71 and L2+L1F1 illustrated in FIG. 3A is the learning filter 72, the structure illustrated in FIG. 3A is included in the structure illustrated in FIG. 3C. Similarly, if the control block group A illustrated in FIG. 3B is the learning filter 71 and the control block group B illustrated in FIG. 3B is the learning filter 72, the structure illustrated in FIG. 3B is also included in the structure illustrated in FIG. 3C.

Next, a method of deriving the learning filter will be described. First, modeling of control targets is performed to derive the learning filter L. Assuming the wafer stage and the reticle stage are one-mass system, the displacements of the wafer stage and the reticle stage are $x_W$ and $x_R$, the control inputs are $u_W$ and $u_R$, and the masses thereof are $m_W$ and $m_R$, the wafer stage and the reticle stage are represented by the following equation of motion:

$$m_W \ddot{x}_W = u_W \quad (3)$$

$$m_R \ddot{x}_R = u_R \quad (4)$$

A state vector is represented as follows:

$$x_W = [x_W \dot{x}_W]^T, x_R = [x_R \dot{x}_R]^T \quad (5).$$

The following state equation and output equations obtained by Expressions 3 and 4 are represented as follows:

$$\dot{x}_W = \begin{bmatrix} 0 & 1 \\ 0 & 0 \end{bmatrix} x_W + \begin{bmatrix} 0 \\ \frac{1}{m_W} \end{bmatrix} u_W = A_W x_W + B_W u_W \quad (6)$$

$$y_W = [1 \ 0] x_W = C_W x_W \quad (7)$$

$$\dot{x}_R = \begin{bmatrix} 0 & 1 \\ 0 & 0 \end{bmatrix} x_R + \begin{bmatrix} 0 \\ \frac{1}{m_R} \end{bmatrix} u_R = A_R x_R + B_R u_R \quad (8)$$

$$y_R = [1 \ 0] x_R = C_R x_R. \quad (9)$$

Figure 4:
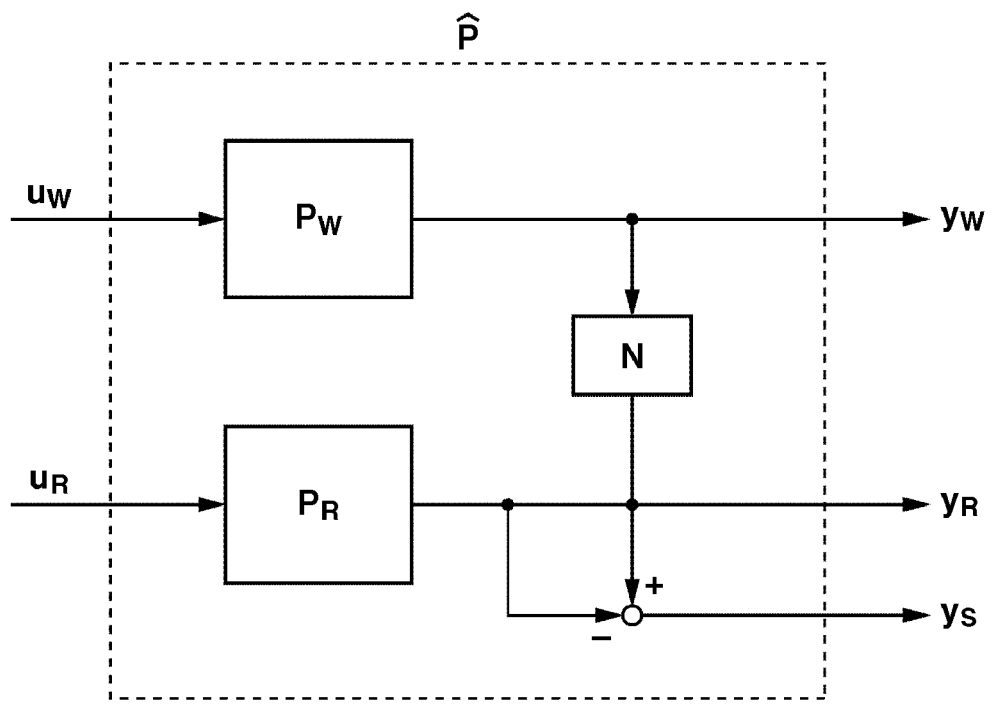
FIG. 4 is a block diagram illustrating an augmented system with respect to the displacement of a wafer stage and a reticle stage, and a synchronization error as outputs.

To derive a bilateral iterative learning control system, an augmented system illustrated in FIG. 4 is to be derived, where observation outputs are the displacements of the wafer stage $y_W$, the displacements of the reticle stage $y_R$ and the synchronization error $y_S$ between the wafer stage and the reticle stage. In FIG. 4, $P_W$ shows a model of the wafer stage represented by Expressions 6 and 7, and $P_R$ shows a model of the reticle stage represented by Expressions 8 and 9. Because N is a projection magnification, the synchronization error $y_S$ between the wafer stage and the reticle stage is described as $Ny_W - y_R$. The state equation and the output equation of the augmented system $\hat{P}$ are represented as follows:

$$\dot{x}_e = \begin{bmatrix} A_W & 0 \\ 0 & A_R \end{bmatrix} x_e + \begin{bmatrix} B_W & 0 \\ 0 & B_R \end{bmatrix} u_e = A_e x_e + B_e u_e \quad (10)$$

$$y_e = \begin{bmatrix} C_W & 0 \\ 0 & C_R \\ NC_W & -C_R \end{bmatrix} x_e = C_e x_e \quad (11)$$

$$x_e = [x_W \ x_R]^T, u_e = [u_W \ u_R]^T. \quad (12)$$

Figure 5:
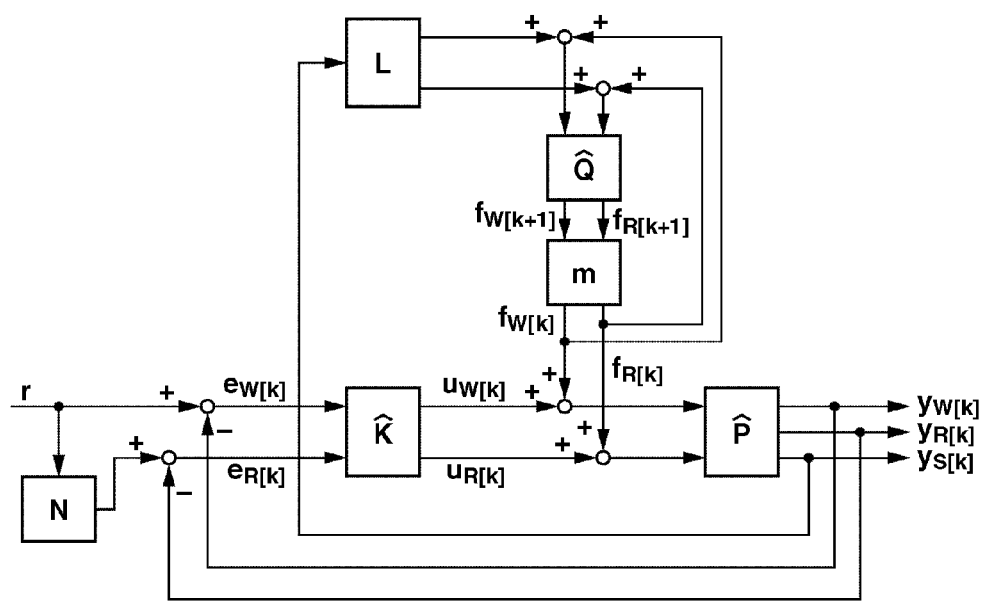
FIG. 5 is a block diagram illustrating bilateral iterative learning control using the augmented system illustrated in FIG. 4.

FIG. 5 illustrates a block diagram for synchronization control to which the iterative learning control is applied.

$\hat{P}$ is an augmented system represented by Expression 10. In the k-th iterative operation, a feedback controller $\hat{K}$ outputs control inputs $u_{W[k]}$ and $u_{R[k]}$ to follow the target trajectories r and Nr of the wafer stage and the reticle stage. $e_{W[k]}$ and $e_{R[k]}$ represents the following errors of the target trajectories r and Nr and the displacements $y_{W[k]}$ and $y_{R[k]}$ of the wafer stage and the reticle stage. The synchronization error $y_{S[k]}$ between the wafer stage and the reticle stage is input to the learning filter L. The output of the learning filter is added to feedforward inputs $f_{W[k]}$ and $f_{R[k]}$ in the k-th iterative operation and is then stored in the memory m as (k+1)-th feedforward inputs $f_{W[k+1]}$ and $f_{R[k+1]}$ through the following stabilizing filter $\hat{Q}$ that will not pass a frequency band unnecessary for learning:

$$\hat{Q} = \begin{bmatrix} Q_W & 0 \\ 0 & Q_R \end{bmatrix} \quad (13)$$

In this case, a learning rule of the iterative learning control is defined as follows:

$$f_{[k+1]} = \hat{Q}(f_{[k]} + Ly_{S[k]}) \quad (14)$$

where $$f_{[k]} = [f_{W[k]} f_{R[k]}]^T \quad (15)$$

Figure 6:
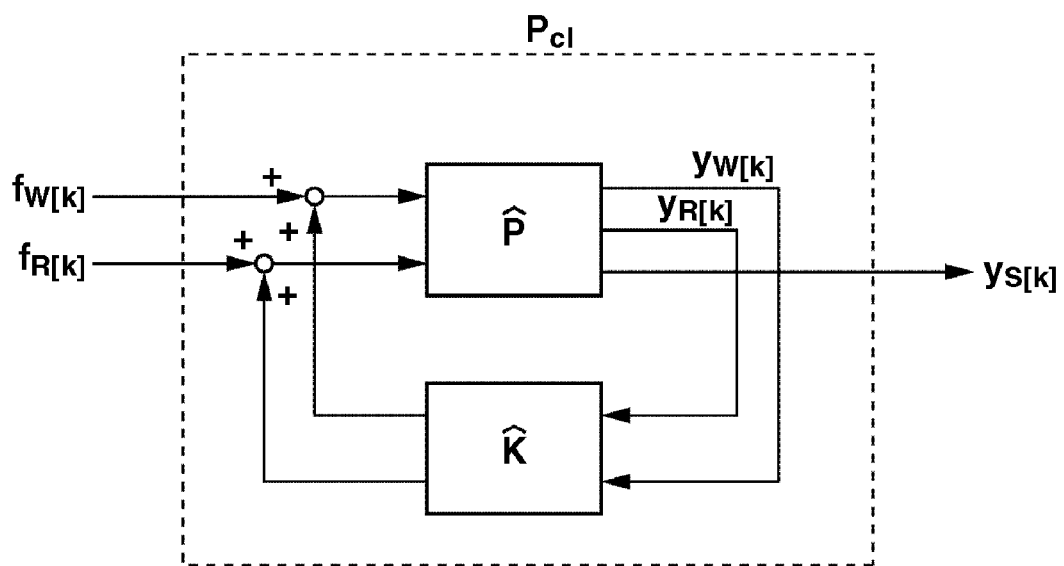
FIG. 6 is a block diagram illustrating a closed loop system, which is a combination of the augmented system illustrated in FIG. 4 and a feedback control system.

A closed loop system $P_{cl}$ is defined as illustrated in FIG. 6, where $\hat{P}$ means the augmented system and $\hat{K}$ means the feedback control system. The block diagram illustrated in FIG. 5 is equivalently exchanged with the structure illustrated in FIG. 7 by using the closed loop system $P_{cl}$. The output of the closed loop system $P_{cl}$ is only the synchronization error $y_{S[k]}$, however, inputs to the stabilizing filter $\hat{Q}$ are the feedforward inputs to the wafer stage and the reticle stage. Therefore, the learning filter L with one input and two outputs is be derived. Since the following equation is established from FIG. 6:

$$y_{S[k]} = P_{cl} f_{[k]} \quad (16)$$

The following relationship between $f_{[k+1]}$ and $f_{[k]}$ is established by Expression 14:

$$f_{[k+1]} = \hat{Q}(I + P_{cl}L)f_{[k]} \quad (17)$$

If it is considered that the convergence of the synchronization error $y_{S[k]}$ is equivalent to the convergence of the feedforward input by the iterative learning control, the following conditions can be satisfied:

$$\|\hat{Q}(I + P_{cl}L)\|_\infty < 1 \quad (18)$$

Figure 7:
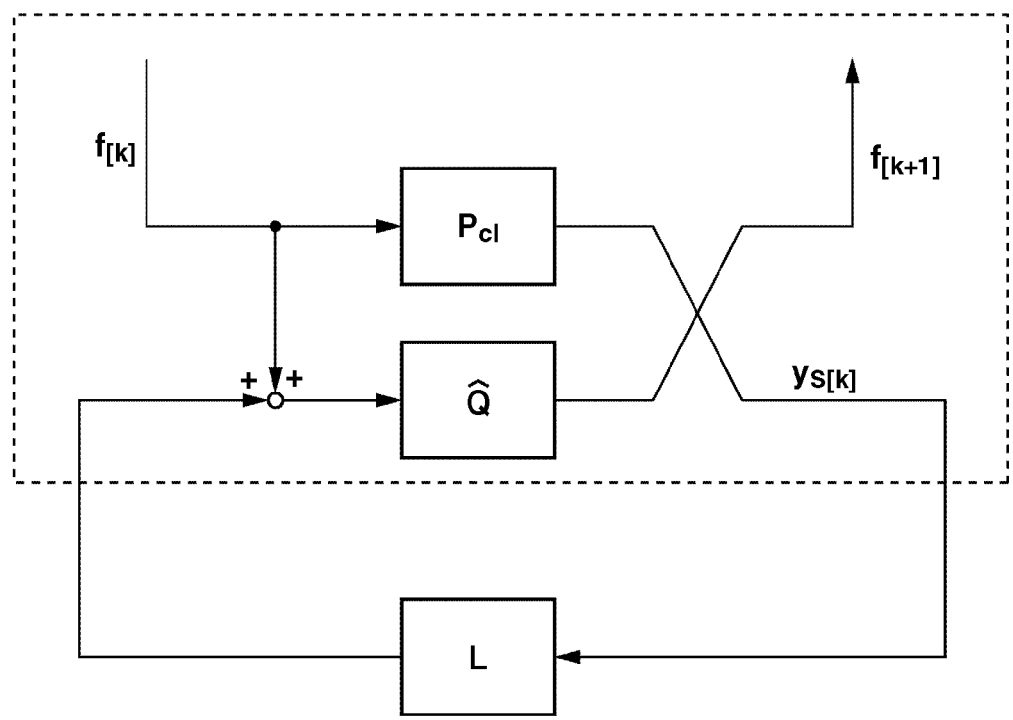
FIG. 7 is a block diagram illustrating a generalized plant used to derive an iterative learning filter.

The multi-input multi-output learning filter L satisfying the above-mentioned conditions is derived by using a portion surrounded by a dashed line in FIG. 7 as a generalized plant and using the H∞ control theory.

In this exemplary embodiment, it is assumed that the masses $m_W$ and $m_R$ of the wafer stage and the reticle stage are 40 kg. It is assumed that the designable servo bandwidths of the wafer stage and the reticle stage are different from each other according to the conditions of the mechanism, and the feedback control systems $\hat{K}$ are designed such that the servo bandwidths are 350 Hz and 250 Hz. Here, it is assumed that the feedback control system $\hat{K}$ is a decentralized control system for each stage and the bilateral property of the feedback control system is not considered. When the bilateral property of the feedback control system is considered, it is also possible to similarly design the system as follows. First, both the stabilizing filters $Q_W$ and $Q_R$ for the wafer stage and the reticle stage are designed using 5-th-order Butterworth filters with a cutoff frequency of 300 Hz. Second, as illustrated in FIG. 6, the augmented system $P_{cl}$ is derived. Next, the stabilizing filter $\hat{Q}$ is formed as represented by Expression 13, and the generalized plant represented by a dashed line in FIG. 7 is created using the augmented system $P_{cl}$ and the stabilizing filter $\hat{Q}$. Finally, the learning filter L is derived by using the H∞ control theory.

Figure 8:
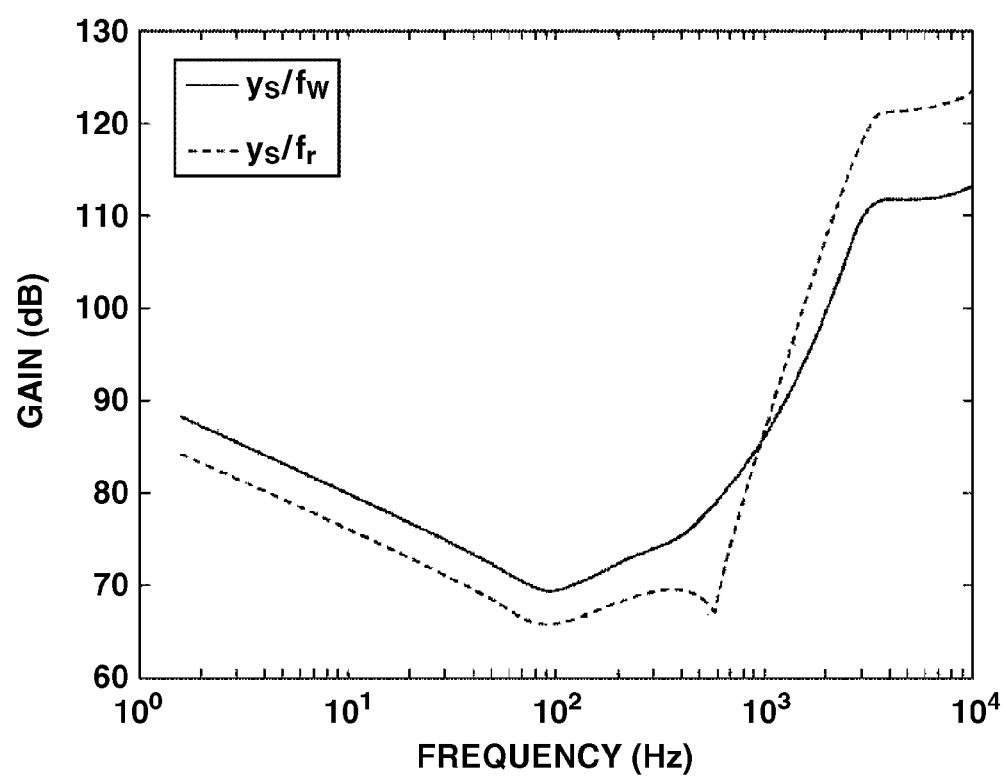
FIG. 8 is a diagram illustrating the gain of a derived learning filter.

FIG. 8 is a diagram illustrating the gain of the derived learning filter. The learning filters that generate feedforward inputs to the wafer stage and the reticle stage according to the synchronization error are represented by a solid line and a dashed line, respectively.

Next, the response of a simulation that synchronously controls the wafer stage and the reticle stage using the control device according to the present exemplary embodiment will be described. In the simulation, a feedforward input for following target drive, which is obtained by multiplying the acceleration obtained by the second-order differentiation of a position profile by amass is given in addition to the iterative learning control and feedback control. In addition, in the simulation, zero-phase low pass filters are used as the stabilizing filters $Q_W$ and $Q_R$. Since the zero-phase low pass filter cannot filter data in real time, the synchronization error $y_S$ is stored in the memories 1 and 2 and the learning represented by Expression 14 is performed whenever one iterative operation ends.

Figure 9:
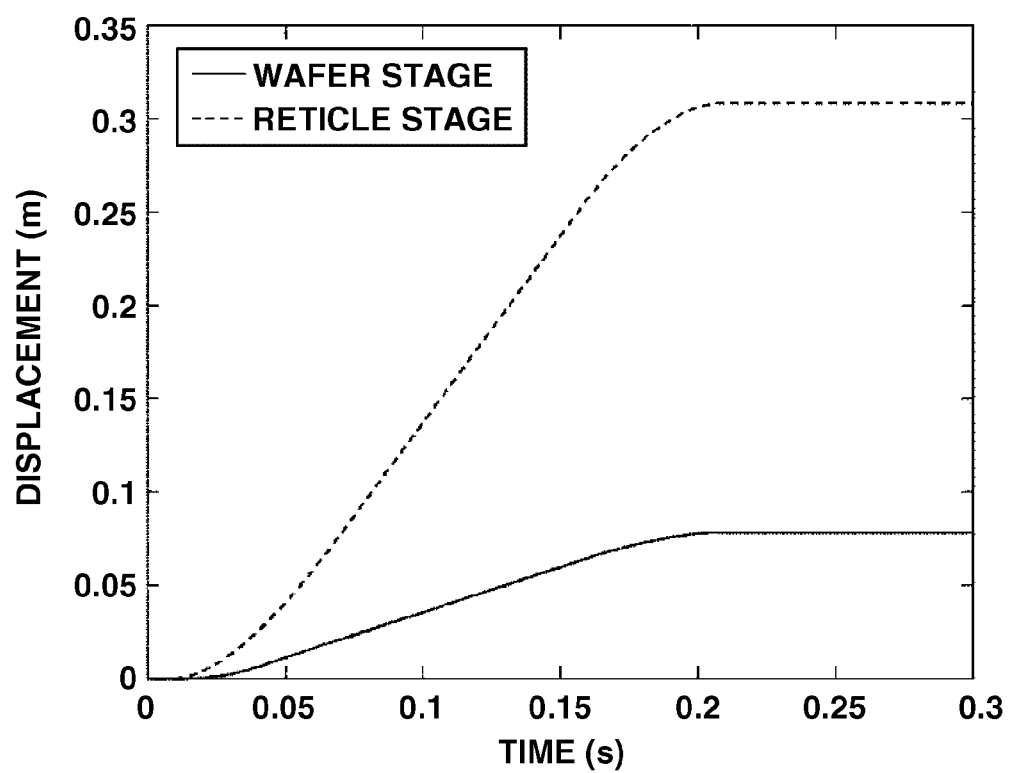
FIG. 9 is a diagram illustrating the target trajectories of the wafer stage and the reticle stage.
Figure 10A:
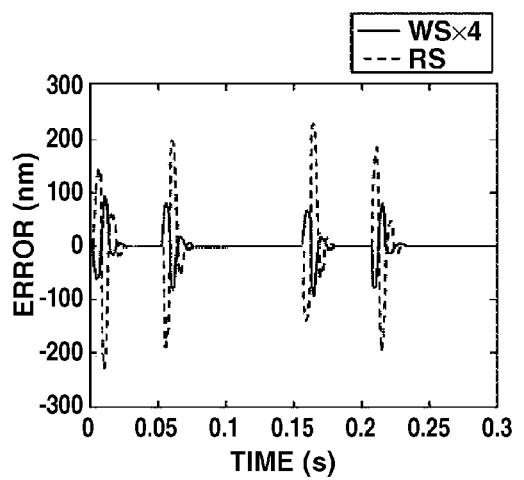
FIGS. 10A to 10D are diagrams illustrating a following error as a simulation response according to the first exemplary embodiment.
Figure 10B:
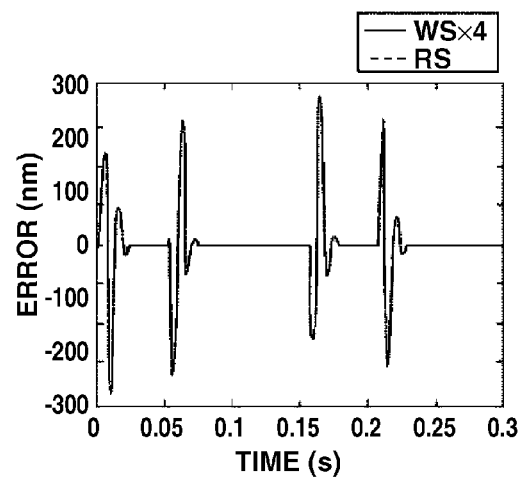
Figure 10C:
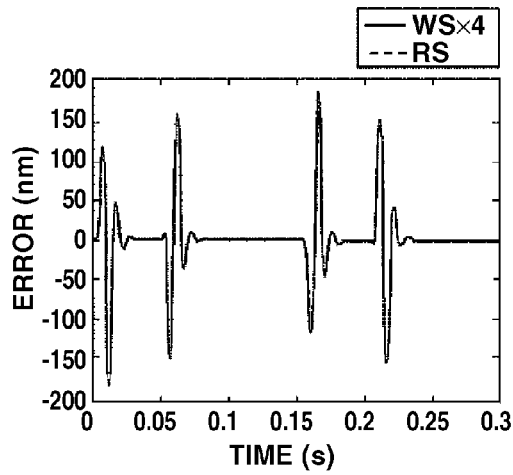
Figure 10D:
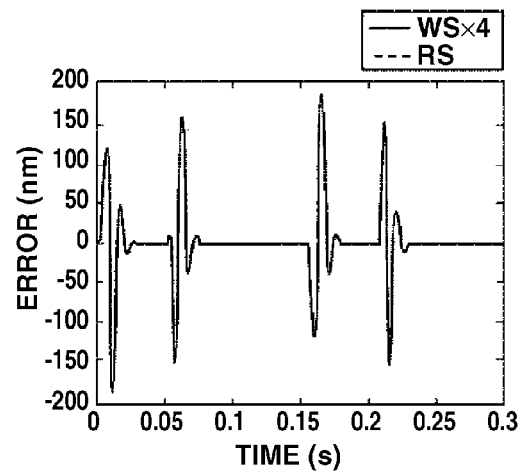

FIG. 9 is a diagram illustrating position profiles, which are the target trajectories of the wafer stage and the reticle stage. A projection magnification is ¼. FIGS. 10A to 10D illustrate the response of simulations when first to fourth operations are performed. A solid line indicates a following error for the target trajectory of the wafer stage, and a dashed line indicates a following error for the target trajectory of the reticle stage. The following error of the wafer stage is four times.

FIGS. 11A to 11D illustrate the response of simulations when the first to fourth operations are performed if iterative learning control is independently performed on the wafer stage and the reticle stage (in other words, master-slave synchronization control or bilateral synchronization control is not performed). Hereinafter, this control is referred to as independent iterative learning control and is discriminated from master-slave synchronization control or bilateral synchronization control.

As can be seen from FIGS. 10A to 11D, according to the present exemplary embodiment, as the number of iterations is increased, the following error of the wafer stage is closer to the following error of the reticle stage.

In the present exemplary embodiment, the servo bandwidth of the wafer stage is set to be higher than that of the reticle stage. Therefore, when a disturbance does not occur, the reticle stage serving as a master and the wafer stage serving as a slave can be synchronized with each other. In the bilateral synchronization control to which the iterative learning control is applied, learning is performed such that the displacement of the wafer stage automatically follows the displacement of the reticle stage, thereby reducing the synchronization error.

Figure 12:
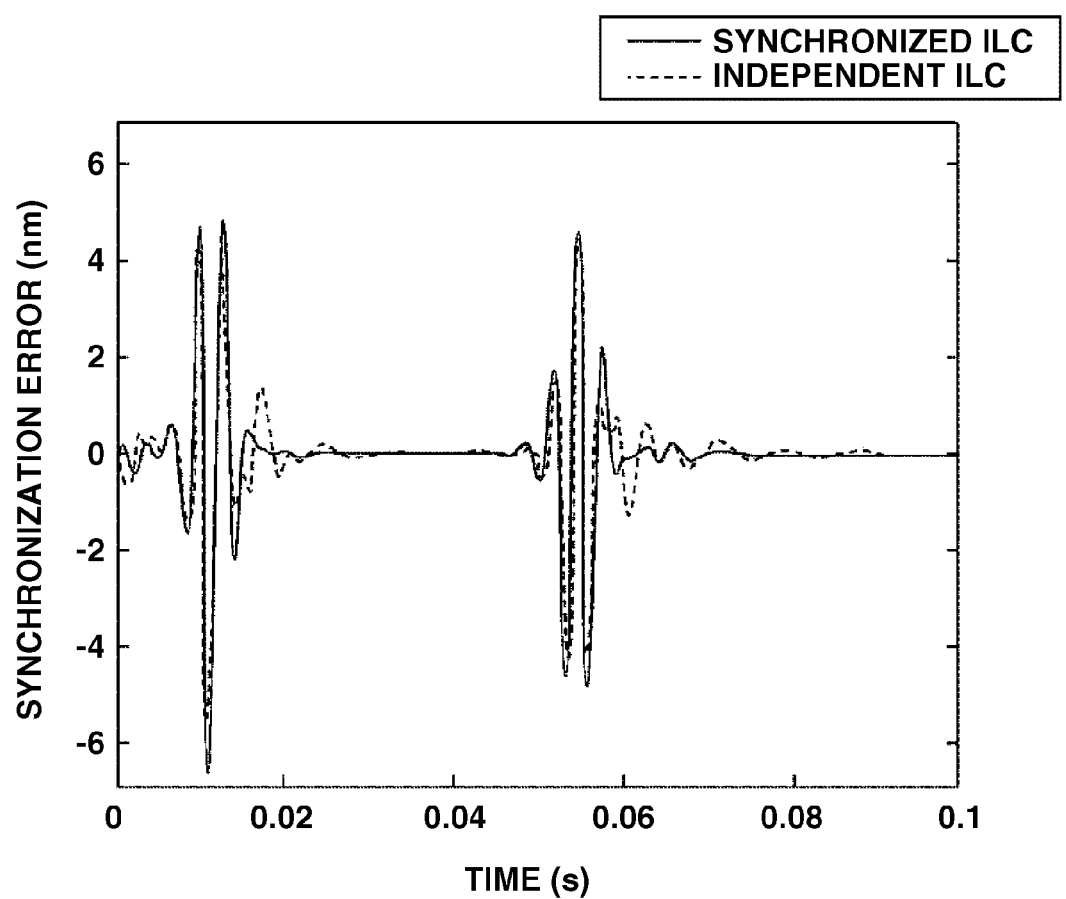
FIG. 12 is a diagram illustrating a synchronization error as a simulation response according to the first exemplary embodiment.
Figure 14A:
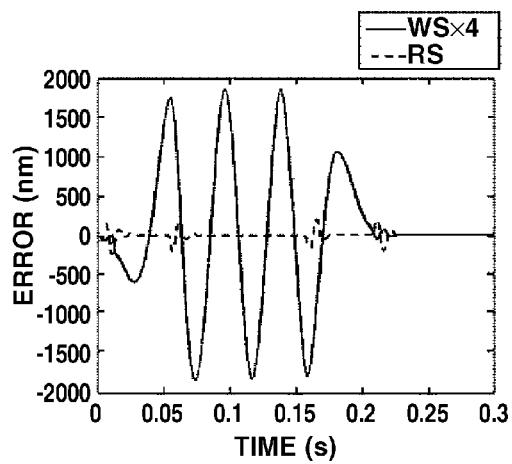
FIGS. 14A to 14D are diagrams illustrating a following error as the response of an independent iterative learning control simulation when a disturbance is applied.
Figure 14B:
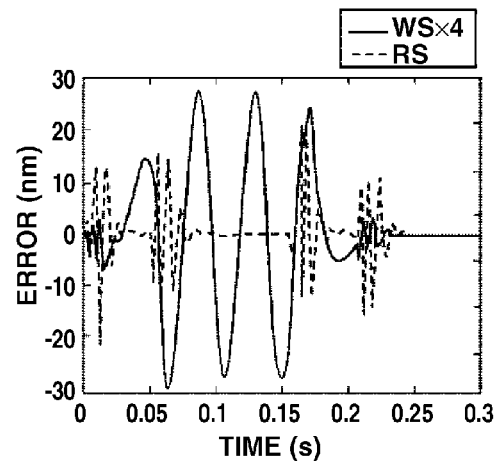
Figure 14C:
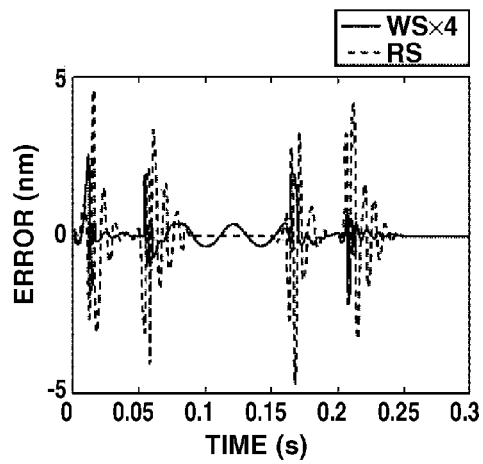
Figure 14D:
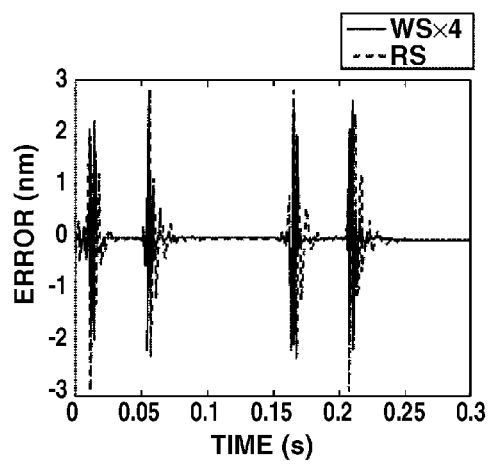

In FIG. 12, a solid line indicates a synchronization error by the bilateral synchronization control to which the iterative learning control illustrated in FIGS. 10A to 10D is applied, and a dashed line indicates a synchronization error by the independent iterative learning control illustrated in FIGS. 11A to 11D. In FIG. 12, the horizontal axis indicates time. FIG. 12 illustrates the response of the fourth operation until 0.1 second.

In the independent iterative learning control, the synchronization error remains up to around 0.09 second. However, in the bilateral synchronization control to which the iterative learning control is applied, the synchronization error is approximately zero at 0.07 second. More specifically, in the bilateral synchronization control to which the iterative learning control is applied, it is possible to rapidly converge the synchronization error with the same number of iterations.

In the bilateral synchronization control to which the iterative learning control is applied, the learning filter is designed using a model that considers the dynamic characteristics between the stages including the feedback control system illustrated in FIG. 6. Meanwhile, in the bilateral synchronization control according to the conventional technology, a synchronization path controller is to be adjusted according to the dynamic characteristics of the stage and a variation in the feedback control system by the trial and error method. However, in the present exemplary embodiment of the invention, the learning filter is designed based on only the model of the stage and the control system, and appropriate synchronization control is achieved by only the iterative operation. Therefore, it is possible to relatively easily derive or adjust a synchronization control system.

Next, the response of a synchronization control simulation when a sinusoidal wave disturbance is applied to the wafer stage will be described. FIGS. 13A to 13D illustrate the response of simulations when the first to fourth operations are performed in the bilateral synchronization control to which the iterative learning control is applied. In FIGS. 13A to 13D, a solid line indicates the following error of the wafer stage, and a dashed line indicates the following error of the reticle stage. FIGS. 14A to 14D illustrate the response of simulations when the first to fourth operations are performed in the independent iterative learning control, which is a comparative example.

When a disturbance is applied to the wafer stage, the controllability of the wafer stage deteriorates. In this case, in the bilateral synchronization control to which the iterative learning control is applied, the synchronization error occurring due to the disturbance applied to the wafer stage is compensated by a control input to the reticle stage. Therefore, the reticle stage is synchronized to follow the wafer stage, and the wafer stage follows the reticle stage during an operation up to 0.05 second within a high frequency band. As such, the bilateral synchronization control is characterized in that the stages compensate the synchronization error therebetween without discriminating a master and a slave. In the conventional technology, it is difficult to adjust the control system of the bilateral synchronization control. However, in the present exemplary embodiment of the invention, it is possible to easily adjust the control system by repeatedly performing an iterative operation.

Figure 15:
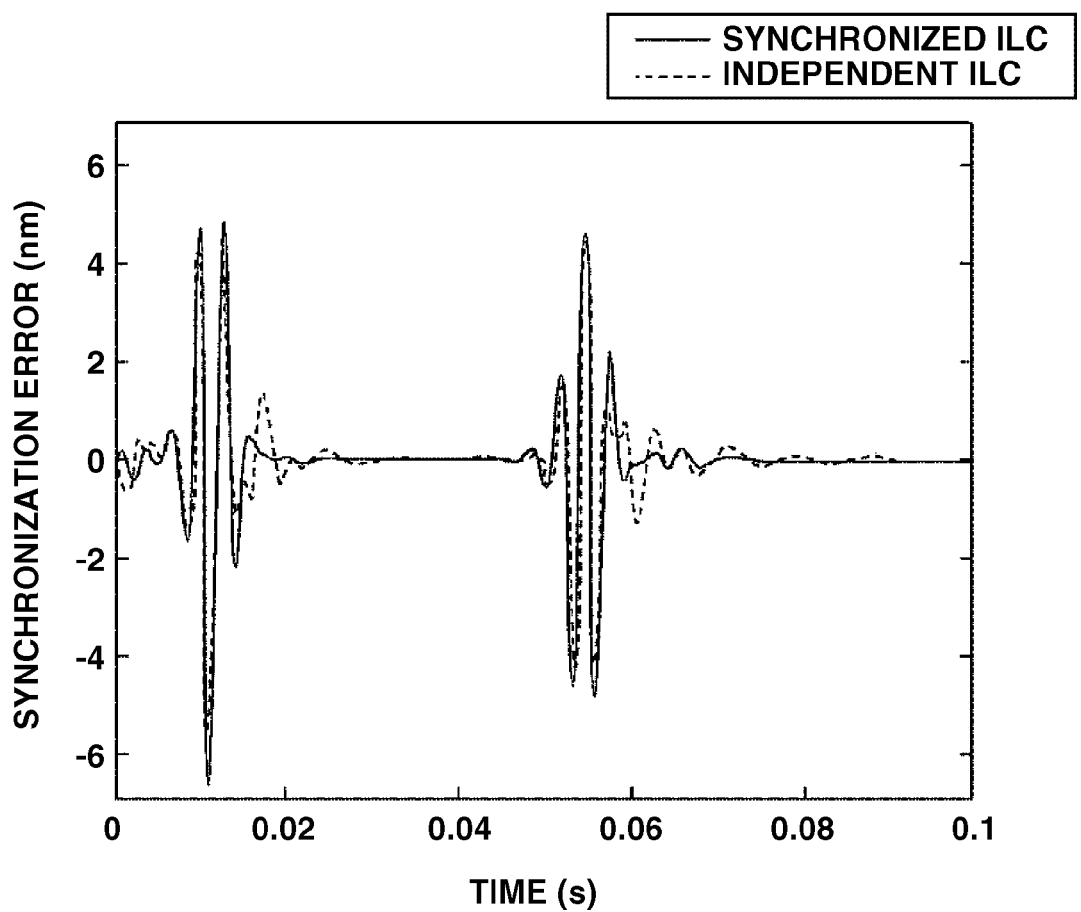
FIG. 15 is a diagram illustrating a synchronization error as a simulation response when a disturbance occurs in the first exemplary embodiment.

In FIG. 15, a solid line indicates a synchronization error by the bilateral synchronization control to which the iterative learning control illustrated in FIGS. 13A to 13D is applied, and a dashed line indicates a synchronization error by the independent iterative learning control illustrated in FIGS. 14A to 14D. Similar to when there is no disturbance, in the bilateral synchronization control to which the iterative learning control is applied, it is possible to rapidly converge the synchronization error with the same number of iterations, as compared to the independent iterative learning control.

Figure 16:
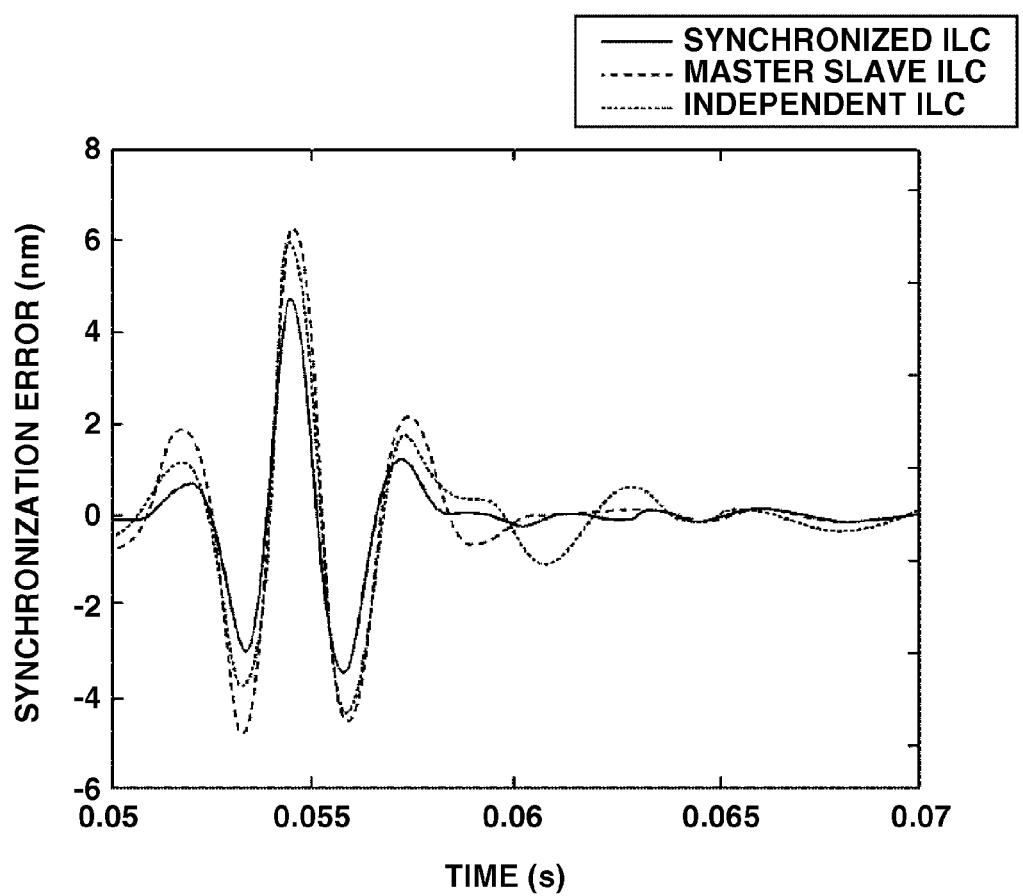
FIG. 16 is a diagram illustrating a synchronization error as a simulation response according to the first exemplary embodiment.

FIG. 16 illustrates the comparison between the responses of the bilateral synchronization control to which the iterative learning control is applied and the master-slave synchronization control to which the iterative learning control is applied. In FIG. 16, a solid line indicates the synchronization error of the bilateral synchronization control to which the iterative learning control is applied. A bold dashed line indicates the synchronization error of the master-slave synchronization control to which the iterative learning control is applied, and a thin dashed line indicates the synchronization error of the independent iterative learning control.

FIG. 16 illustrates the responses during a period from 0:05 second to 0.07 second. Here, the stabilizing filters $Q_W$ and $Q_R$ for the wafer stage and the reticle stage have the same cutoff frequency, and the bilateral synchronization control to which the iterative learning control is applied to is slightly better than the master-slave synchronization control to which the iterative learning control is applied, but there is not much difference therebetween. This is because the reticle stage serves as a master, the wafer stage serves as a slave, and an effect of the bilateral synchronization control hardly appears. Therefore, the cutoff frequency of the stabilizing filter $Q_R$ of the reticle stage is changed to 357 Hz and the learning filter is redesigned.

In this way, a feedforward input with a wider frequency component is applied to the reticle stage, and the bilateral compensation of the synchronization error of the reticle stage is improved. In this case, the feedforward input that is beyond the servo bandwidth of the reticle stage is generated. Therefore, the feedforward input such that it does not excite the vibration mode of the reticle stage is to be adjusted. In the master-slave synchronization control, since there is no feedforward input to the reticle stage, it is not necessary to perform the adjustment. As a result, as illustrated in FIG. 16, the bilateral synchronization control to which the iterative learning control is applied can minimize the synchronization error.

Figure 24:
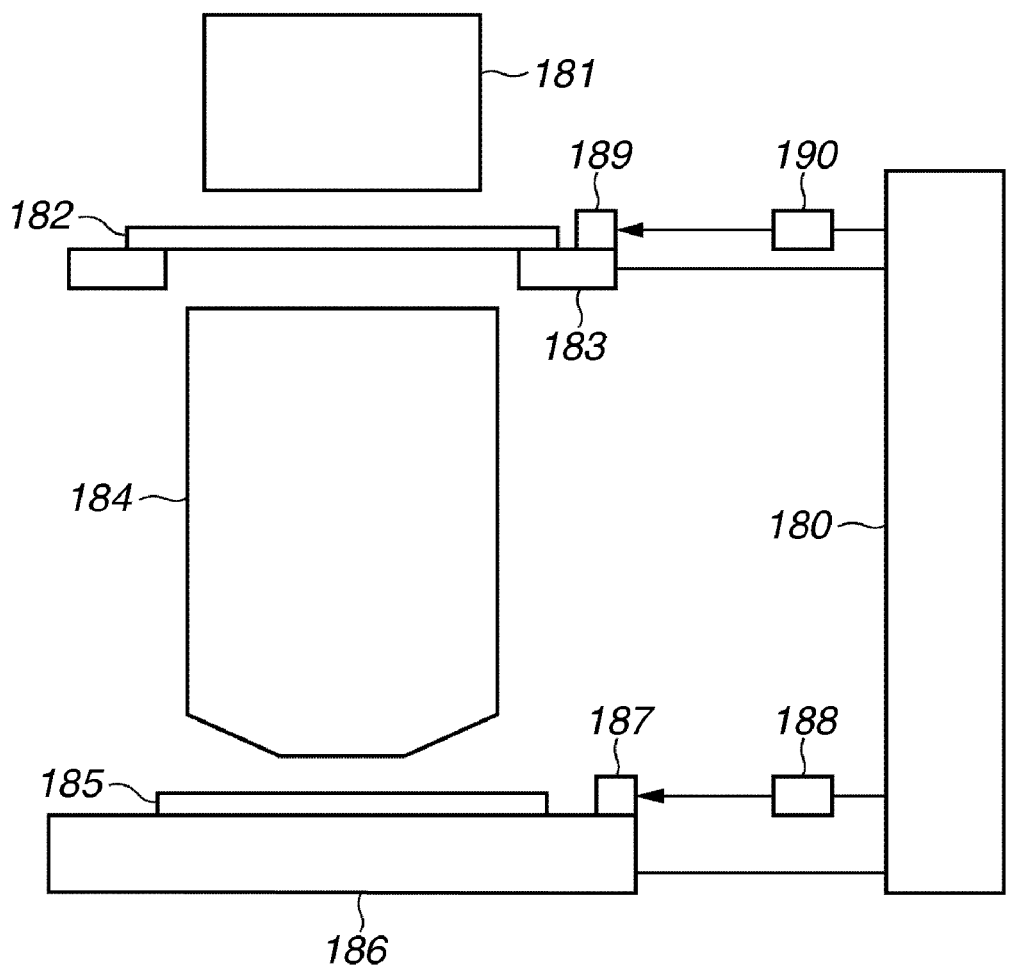
FIG. 24 is a diagram illustrating an exposure apparatus.

FIG. 24 is a diagram schematically illustrating a scanning exposure apparatus including the control device according to the exemplary embodiment of the invention. The exposure apparatus according to the present exemplary embodiment is just an example, but the invention is not limited thereto. Light emitted from an illumination optical system 181 is incident on a reticle 182, which is an original plate. The pattern of the reticle 182 is reduced and projected at the projection magnification of a reduction projection lens 184, and a pattern image is formed on an image surface.

The reticle 182 is mounted on a movable reticle stage 183, and the positional information of the reticle stage 183 is measured by a laser interferometer 190 all the time. A mirror 189 for reflecting the measurement light of the interferometer is fixed to the reticle stage 183. A resist is applied onto the surface of a wafer 185, which is a substrate to be exposed, and a shot formed in an exposure process is arranged on the surface of the wafer. The wafer 185 is loaded on a movable wafer stage 186, and the positional information of the wafer stage 186 is measured by an interferometer 188 all the time. A mirror 187 for reflecting the measurement light of the interferometer is fixed to the wafer stage 186. During scanning (exposure), the wafer stage 186 and the reticle stage 183 are synchronously controlled.

An iterative learning control device 180 according to an exemplary embodiment of the invention generates a control signal based on the positional information output from the interferometer 190 and the interferometer 188. Then, the iterative learning control device 180 controls the positions of the reticle stage 183 and the wafer stage 186, performs an iterative operation several times before exposure starts, and generates a control input. After exposure starts, the iterative learning control device 180 may or may not update the control input.

Next, a method of manufacturing a device (for example, a semiconductor device or a liquid crystal display device) according to an exemplary embodiment of the invention will be described. Here, a method of manufacturing a semiconductor device will be described as an example.

A semiconductor device is manufactured by a pre-process of forming an integrated circuit on a wafer and a post-process of forming an integrated circuit chip on the wafer as a product. The pre-process includes a process of exposing the wafer having a photosensitizing agent applied thereon using the above-mentioned exposure apparatus and a process of developing the wafer. The post-process includes an assembly process (dicing and bonding processes) and a packaging process (package). The liquid crystal display device is manufactured by a process of forming a transparent electrode. The process of forming the transparent electrode includes a process of applying a photosensitizing agent onto a glass substrate having a transparent conductive film thermally adhering thereto, a process of exposing the glass substrate having the photosensitizing agent applied thereon using the above-mentioned exposure apparatus, and a process of developing the glass substrate.

According to the device manufacturing method of the present exemplary embodiment, it is possible to manufacture a high-quality device, as compared to the conventional technology.

The first exemplary embodiment relates to the bilateral synchronization control. In a second exemplary embodiment, an example of multi-lateral synchronization control will be described. In the second exemplary embodiment, a description of the same components as those in the first exemplary embodiment will be omitted.

Figure 17:
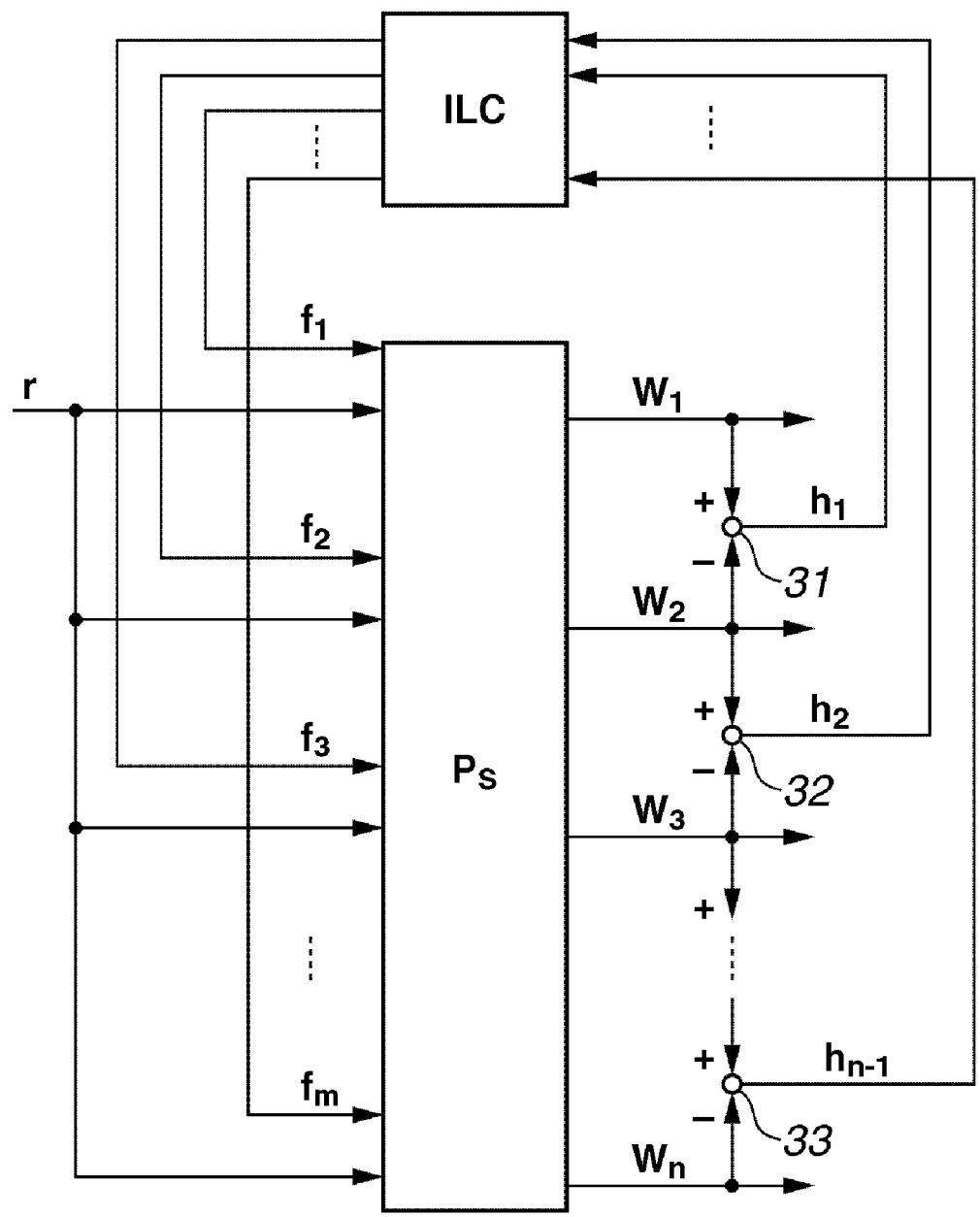
FIG. 17 is a block diagram illustrating iterative learning control according to a second exemplary embodiment.

FIG. 17 is a control block diagram illustrating a control device according to the second exemplary embodiment. The control device includes a control system $P_S$ including a plurality of control targets and an iterative learning control circuit ILC. The control system $P_S$ outputs $w_1, w_2, \ldots, w_n$ (n is the number of axes to be synchronized), and arithmetic units 31, 32, and 33 calculate synchronization errors $h_1, h_2, \ldots, h_{n-1}$. The synchronization errors $h_1, h_2, \ldots, h_{n-1}$ are input to the iterative learning control circuit ILC. The iterative learning control circuit ILC generates feedforward control inputs $f_1, f_2, \ldots, f_m$ based on the inputs, and outputs the generated control inputs to the control system $P_S$.

Figure 18:
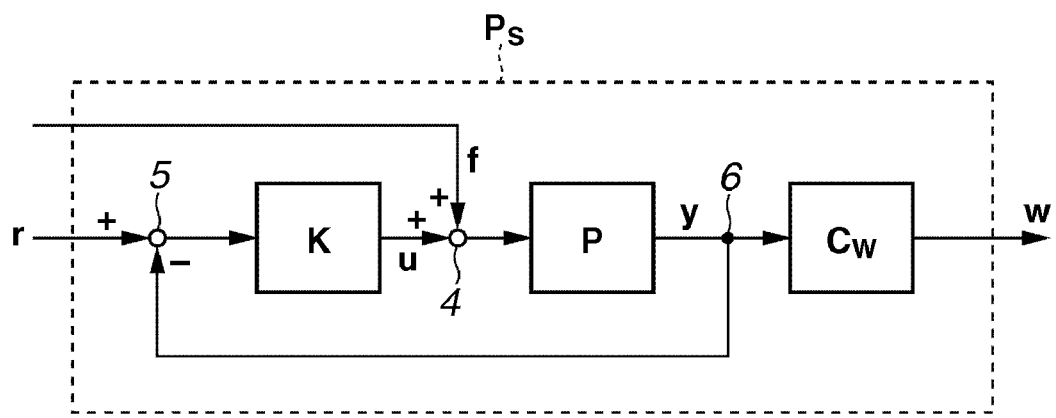
FIG. 18 is a diagram illustrating the detailed structure of a control system $P_S$ illustrated in FIG. 17.

FIG. 18 is a block diagram illustrating the detailed structure of the control system $P_S$. The control system includes a control target P with m inputs and l outputs (m and l are natural numbers equal to or greater than 2), a detection unit 6 that detects the position y of the control target, a feedback controller K with l inputs and m outputs, and a subtraction unit 5 that subtracts the output of the detection unit from a target trajectory r. A feedforward control input is input to the control target through an adder 4. The control system $P_S$ acquires n outputs (n is a natural number equal to or greater than 2) to be synchronized among l outputs of the control target, and calculates a matrix $C_W$ for arbitrarily arranging the acquired outputs.

Figure 19:
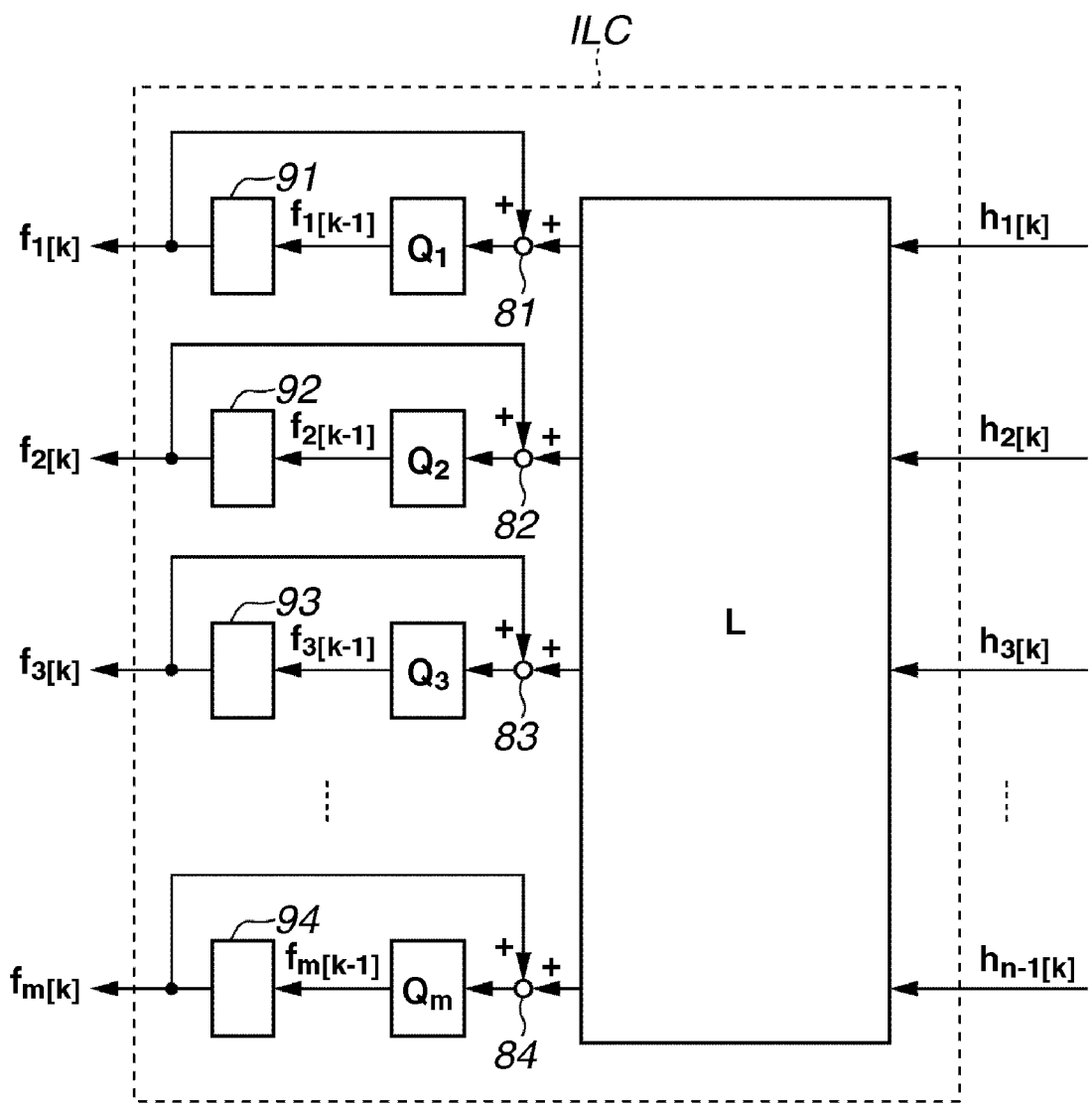
FIG. 19 is a diagram illustrating the detailed structure of an iterative learning control circuit ILC illustrated in FIG. 18.

FIG. 19 is a diagram illustrating the detailed structure of the iterative learning control circuit ILC. The iterative learning control circuit repeatedly performs following control on the target trajectory, similar to the first exemplary embodiment. All the moving members (control axes) have the same target trajectory r, or the target trajectory of one moving member (control axis) is an integer multiple of the position of the other moving member (control axis).

The iterative learning control circuit ILC includes a learning filter L, m stabilizing filter groups $Q_1, Q_2, \ldots, Q_m$ that cut a frequency band for the learning of the learning filter L, and memory devices 91 to 94 that store the outputs of the stabilizing filters.

When the number of iterative learning operations is k, the learning filter L generates m control inputs $f_{1[k]}, f_{2[k]}, \ldots f_{m[k]}$ based on n−1 synchronization errors $h_{1[k]}, h_{2[k]}, \ldots, h_{n-1[k]}$, which are inputs. The generated inputs are feed forward to moving members (control axis) corresponding to each control input.

Hence, in the exemplary embodiment, the control input and the synchronization error are represented as follows:

$$f_{[k]} = [f_{1[k]}, \ldots, f_{m[k]}]^T \quad (19),$$

and $$h_{[k]} = [h_{1[k]}, \ldots, h_{n-1[k]}]^T \quad (20)$$

Since digital control is performed similar to the first exemplary embodiment, the control input and the synchronization error of an i-th sample in a k-th operation are referred to as $f_{[k]i}$ and $h_{[k]i}$.

Since the flow of the process according to the second exemplary embodiment is substantially the same as that according to the first exemplary embodiment, a detailed description thereof will not be repeated. First, in the k-th (k>2) operation, the control input $f_{[k]i}$ is applied to the control target. In this case, the synchronization error $h_{[k]i}$ is input to the learning filter L. The output of the learning filter L is added to the control input $f_{[k]i}$ by adders 81 to 84, and the added value is stored as the following (k+1)-th control input in the memories through the stabilizing filters $Q_1, Q_2, \ldots, Q_m$:

$$f_{[k+1]i} = [f_{1[k+1]}, \ldots, f_{m[k+1]}]^T \quad (21)$$

The operation is repeatedly performed until it is determined that the maximum value $h_{max}$ of all of the synchronization errors during one operation is sufficiently small.

Next, results of a multi-lateral iterative learning control simulation will be described. In the simulation, a control target has four axes. Each axis is assumed one-mass system, and the mass thereof is 40 kg.

When the outputs of the axes are described as $w_1, w_2, w_3,$ and $w_4$, the synchronization error between the axes is written as follows:

$$h_1 = w_1 - w_2 \quad (22),$$

$$h_2 = w_2 - w_3 \quad (23), \text{ and}$$

$$h_3 = w_3 - w_4 \quad (24).$$

Feedback controllers are designed for each axis, and the servo bandwidths thereof are 355 Hz, 306 Hz, 217 Hz, and 177 Hz. All of the stabilizing filters are 5-th-order Butterworth filters with a cutoff frequency of 300 Hz, and a learning filter with three inputs and four outputs is derived by the same process as that in the first exemplary embodiment.

Figure 20:
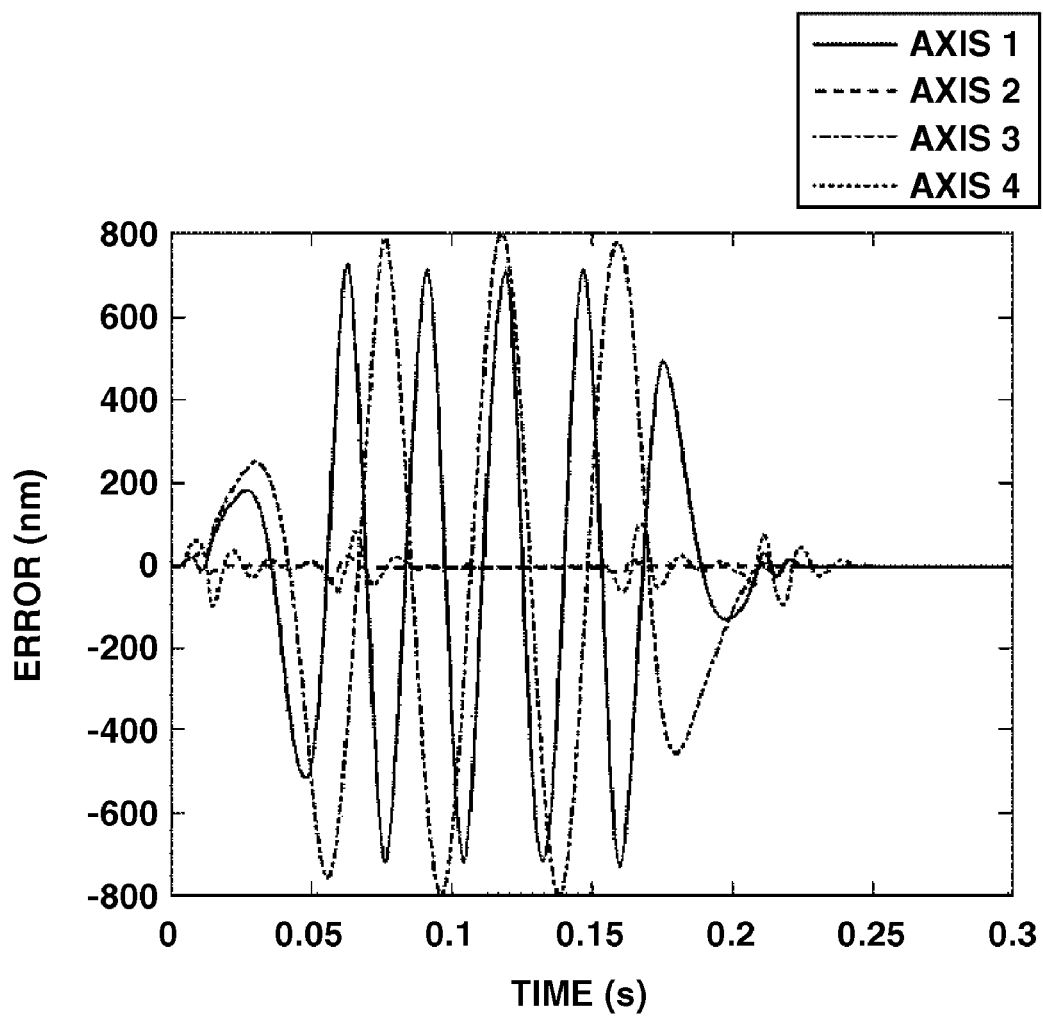
FIG. 20 is a diagram illustrating a following error as a simulation response when the iterative learning control according to the second exemplary embodiment is not performed.
Figure 22:
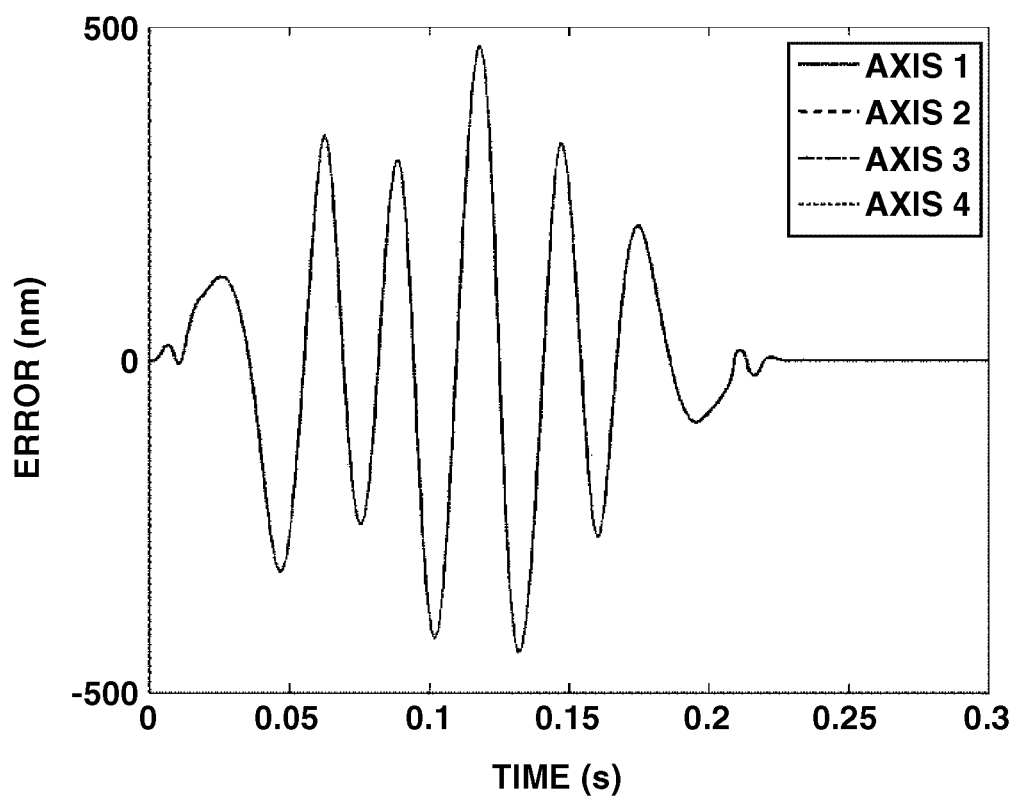
FIG. 22 is a diagram illustrating a following error as a simulation response according to the second exemplary embodiment.

FIG. 22 illustrates the following error of a 5-th iterative operation when the above-mentioned control device is used to control all the axes to follow the target trajectory. The target trajectory represented by a solid line in FIG. 9 is used. A first axis is represented by a solid line, a second axis is represented by a bold dashed line, a third axis is represented by a one-dot chain line, and a fourth axis is represented by a dashed line. Sine wave disturbances with different frequencies are applied to the first axis and the third axis. FIG. 20 illustrates the following error before the iterative learning control is performed, which is a comparative example.

Figure 21:
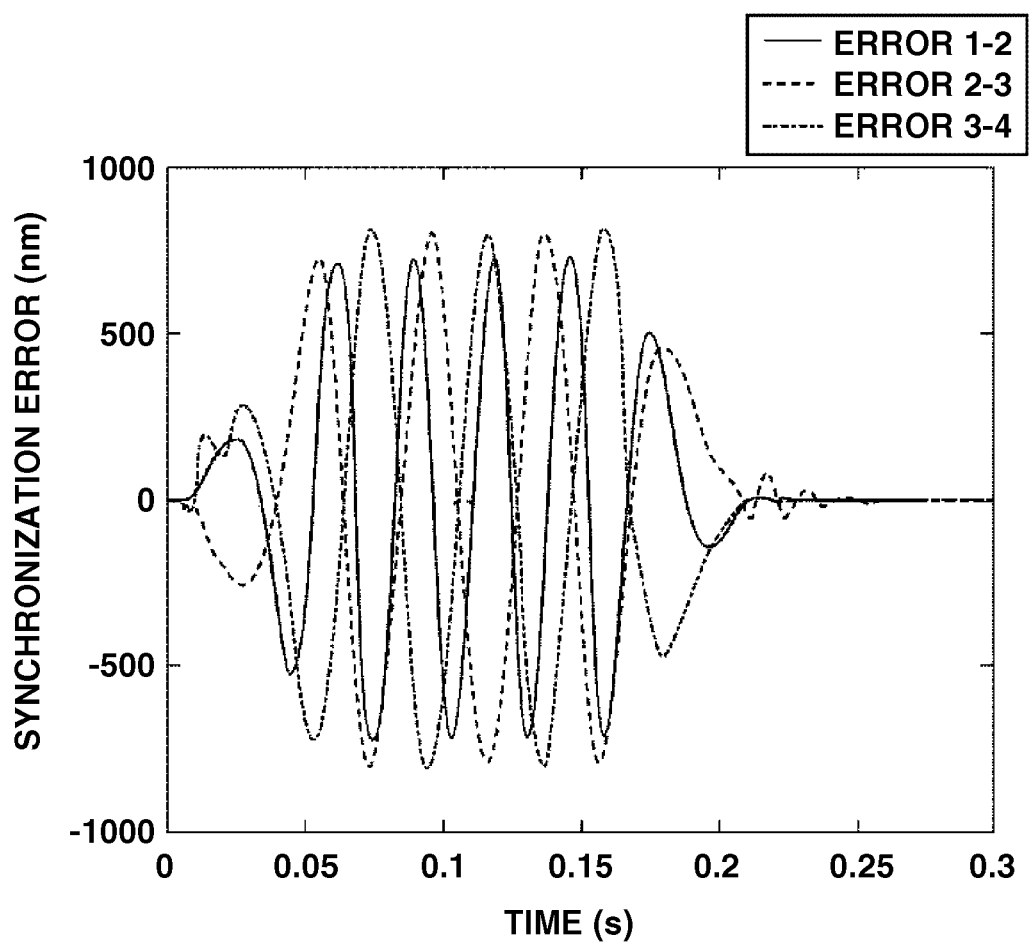
FIG. 21 is a diagram illustrating a synchronization error as a simulation response when the iterative learning control according to the second exemplary embodiment is not performed.
Figure 23:
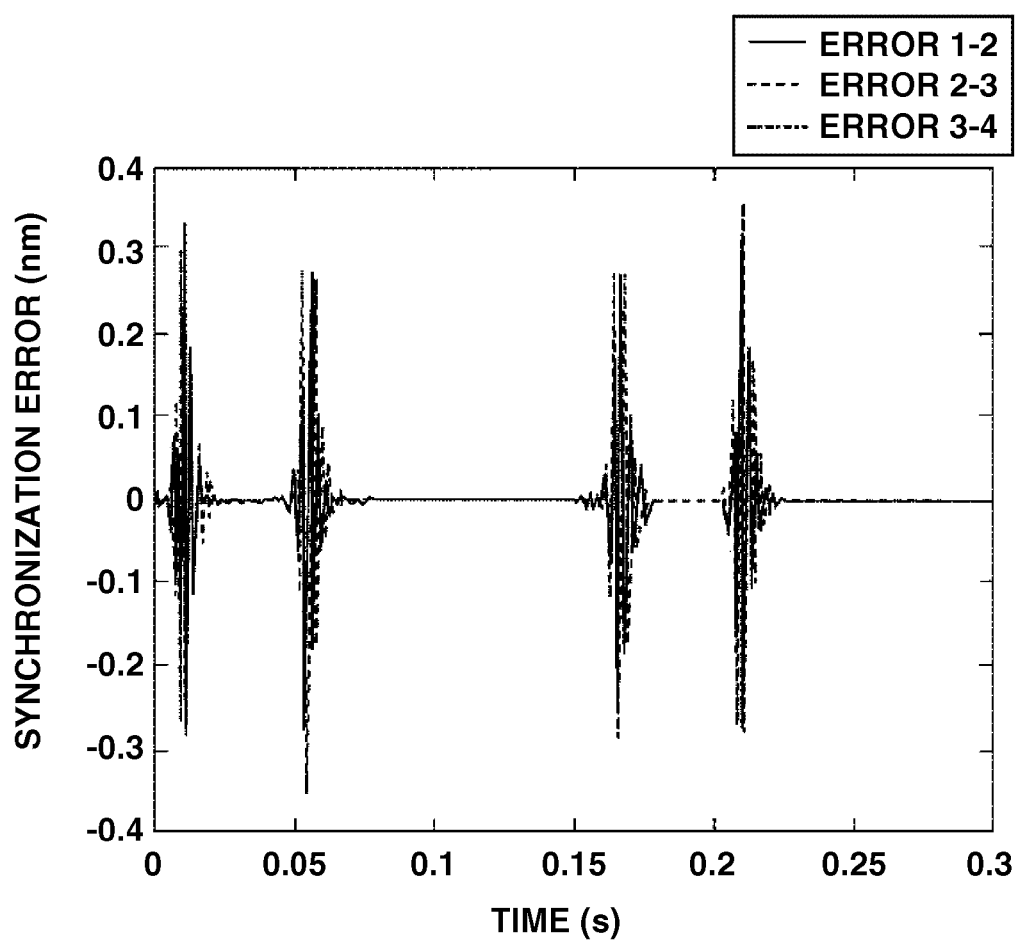
FIG. 23 is a diagram illustrating a synchronization error as a simulation response according to the second exemplary embodiment.

FIG. 23 illustrates the synchronization error between the axes in the fifth iterative operation. The synchronization error between the first axis and the second axis is represented by a solid line, the synchronization error between the second axis and the third axis is represented by a dashed line, and the synchronization error between the third axis and the fourth axis is represented by a one-dot chain line. FIG. 21 illustrates the synchronization error before the iterative learning control is performed, which is a comparative example.

As can be seen from FIG. 22, the following errors of all the axes are substantially equal to each other. As can be seen from FIG. 23, the synchronization error between the axes is reduced. As can be seen from the comparison between FIGS. 22 and 20, a specific axis that another axis follows does not exist. In other words, multi-lateral synchronization control is achieved by the iterative learning control.

According to the present exemplary embodiment, in bilateral (multi-lateral) synchronization control, it is possible to improve the accuracy of synchronization while simply deriving or adjusting a control system.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-022723 filed Feb. 3, 2009, which is hereby incorporated by reference herein in its entirety.

What is claimed is:

1. A control device comprising:
   a first control circuit configured to control a position of a first control target;
   a second control circuit configured to control a position of a second control target;
   a calculation unit configured to calculate a synchronization error between the first control target and the second control target; and
   an iterative learning control circuit including first and second learning filters to which the synchronization error is input, and configured to feed forward a control input to the first control target based on an output of the first learning filter and to feed forward a control input to the second control target based on an output of the second learning filter.

2. The control device according to claim 1,
   wherein each of the first and second learning filters includes transfer functions of the first and second control targets and transfer functions of controllers of the first and second control circuits.

3. The control device according to claim 1,
   wherein the first learning filter includes a transfer function of the first control target and a transfer function of a controller of the first control circuit, and the second learning filter includes a transfer function of the second control target and the transfer function of the controller of the second control circuit.

4. The control device according to claim 3, wherein
   a portion of the output of the first learning filter is added to the output of the second learning filter, and
   a portion of the output of the second learning filter is added to the output of the first learning filter.

5. The control device according to claim 1,
   wherein the iterative learning control circuit includes:
   a first stabilizing filter configured to transmit a predetermined band of the output of the first learning filter; and
   a second stabilizing filter configured to transmit a predetermined band of the output of the second learning filter.

6. The control device according to claim 1,
   wherein the iterative learning control circuit includes:
   a first memory device configured to store the output of the first learning filter; and
   a second memory device configured to store the output of the second learning filter.

7. A control device comprising:
a control circuit configured to control a position of each of a plurality of control targets;
a calculation unit configured to calculate a synchronization error between the plurality of control targets; and
an iterative learning control circuit including a plurality of learning filters to which the synchronization error is input and configured to feed forward a control input to the control target corresponding to each of the learning filters based on an output of each of the learning filters.

8. The control device according to claim 7,
wherein the plurality of learning filters include transfer functions of the plurality of control targets and transfer functions of controllers of the plurality of control circuits.

9. The control device according to claim 7,
wherein the output of each of the learning filters is added to by the outputs of the other learning filters.

10. A scanning exposure apparatus comprising:
the control device according to claim 1,
wherein a stage having a substrate mounted thereon and a stage having an original plate mounted thereon are synchronized with each other by the control device.

11. A method of manufacturing a device, comprising:
exposing a substrate to a pattern using the scanning exposure apparatus according to claim 10; and
developing the exposed substrate.

12. A control method comprising:
controlling a position of a first control target;
controlling a position of a second control target;
calculating a synchronization error between the first control target and the second control target; and
an iterative learning control method including inputting the synchronization error to first and second learning filters, and feed forwarding a control input to the first control target based on an output of the first learning filter and feed forwarding a control input to the second control target based on an output of the second learning filter.

13. The control method according to claim 12,
wherein each of the first and second learning filters includes transfer functions of the first and second control targets and transfer functions of controllers of the first and second control circuits.

14. The control method according to claim 12,
wherein the first learning filter includes a transfer function of the first control target and a transfer function of a controller of the first control circuit, and the second learning filter includes a transfer function of the second control target and the transfer function of the controller of the second control circuit.

15. The control method according to claim 14, wherein
adding to the output of the second learning filter a portion of the output of the first learning filter, and
adding to the output of the first learning filter a portion of the output of the second learning filter.

16. The control method according to claim 12,
wherein the iterative learning control circuit includes:
transmitting a predetermined band of the output of the first learning filter; and
transmitting a predetermined band of the output of the second learning filter.

17. The control method according to claim 12, further comprising:
storing the output of the first learning filter; and
storing the output of the second learning filter.

* * * * *